United States Patent
Yoon et al.

(10) Patent No.: US 9,597,804 B2
(45) Date of Patent: Mar. 21, 2017

(54) AUTO-CLEANING SYSTEM, CLEANING ROBOT AND METHOD OF CONTROLLING THE CLEANING ROBOT

(71) Applicant: SAMSUNG ELECTRONICS CO., LTD., Suwon-si (KR)

(72) Inventors: Sang Sik Yoon, Gimpo-si (KR); Woo Ram Chung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 36 days.

(21) Appl. No.: 14/444,189

(22) Filed: Jul. 28, 2014

(65) Prior Publication Data
US 2015/0032260 A1 Jan. 29, 2015

(30) Foreign Application Priority Data

Jul. 29, 2013 (KR) ........................ 10-2013-0089652

(51) Int. Cl.
*G05B 19/04* (2006.01)
*G05B 19/18* (2006.01)
(Continued)

(52) U.S. Cl.
CPC .......... *B25J 9/1697* (2013.01); *A47L 9/2857* (2013.01); *B25J 11/0085* (2013.01);
(Continued)

(58) Field of Classification Search
CPC ............ A47L 9/2857; A47L 11/4011; G05B 2219/45098; G05D 1/0016; G05D 2201/0203
(Continued)

(56) References Cited

U.S. PATENT DOCUMENTS 5,032,775 A * 7/1991 Mizuno ................. B08B 3/024
 15/319
2006/0241808 A1* 10/2006 Nakadai ............... G06K 9/0057
 700/245
(Continued)

FOREIGN PATENT DOCUMENTS

KR 2001-0106845 12/2001
KR 10-2004-0031580 4/2004
(Continued)

OTHER PUBLICATIONS

International Search Report mailed Nov. 14, 2014 issued in corresponding International Patent Application PCT/KR2014/006937.
(Continued)

*Primary Examiner* — Harry Oh
(74) *Attorney, Agent, or Firm* — Staas & Halsey LLP

(57) ABSTRACT

A cleaning robot that performs cleaning while travelling a space to be cleaned, the cleaning robot including: a travelling unit that moves the cleaning robot; a cleaning unit that cleans the space to be cleaned; an image capturing unit that captures an image viewed from the cleaning robot; a voice input unit to which a user's voice instructions are input; and a controller obtaining the user's motion instructions through the image capturing unit and determining a restricted area in which entry of the cleaning robot is prohibited and/or a focused cleaning area to be intensely cleaned by the cleaning robot based on the user's motion instructions or the user's voice instructions when the user's voice instructions are input through the voice input unit. The restricted area and the focused cleaning area may be input to the cleaning robot through the user's voice and motion.

20 Claims, 29 Drawing Sheets

(51) Int. Cl.
  *B25J 9/16* (2006.01)
  *B25J 11/00* (2006.01)
  *B25J 13/00* (2006.01)
  *A47L 9/28* (2006.01)
  *G05D 1/00* (2006.01)

(52) U.S. Cl.
  CPC .......... *B25J 13/003* (2013.01); *G05D 1/0016* (2013.01); *A47L 2201/04* (2013.01); *G05B 2219/39441* (2013.01); *G05B 2219/45098* (2013.01); *G05D 2201/0203* (2013.01)

(58) Field of Classification Search
  USPC .......................................................... 700/257
  See application file for complete search history.

(56) References Cited

U.S. PATENT DOCUMENTS

| | | | | |
|---|---|---|---|---|
| 2011/0145000 A1* | 6/2011 | Hoepken | ................ | G10L 15/22 704/275 |
| 2011/0306420 A1* | 12/2011 | Nishimoto | .............. | G06F 3/005 463/36 |
| 2013/0009861 A1* | 1/2013 | Valik | .................... | G06F 3/0304 345/156 |
| 2013/0056032 A1 | 3/2013 | Choe et al. | | |
| 2013/0060379 A1* | 3/2013 | Choe | ..................... | G06N 3/008 700/245 |
| 2013/0232717 A1* | 9/2013 | Lee | ...................... | G05D 1/0255 15/319 |
| 2013/0326839 A1* | 12/2013 | Cho | ..................... | A47L 9/2805 15/319 |
| 2014/0116469 A1* | 5/2014 | Kim | ...................... | A47L 9/2894 134/18 |
| 2014/0303775 A1* | 10/2014 | Oh | ........................ | G05D 1/0016 700/253 |
| 2015/0002734 A1* | 1/2015 | Lee | ...................... | H04N 5/2256 348/367 |
| 2015/0039127 A1* | 2/2015 | Matsumoto | ............ | G08C 17/02 700/253 |

FOREIGN PATENT DOCUMENTS

KR  10-2006-0027727  3/2006
KR  10-2012-0116278  10/2012

OTHER PUBLICATIONS

Notice of Acceptance issued on Jul. 14, 2016 in corresponding Australian Patent Application No. 2014297039.
Canadian Office Action issued on Dec. 6, 2016 in corresponding Canadian Patent Application No. 2,918,318.

* cited by examiner

AUTO-CLEANING SYSTEM, CLEANING ROBOT AND METHOD OF CONTROLLING THE CLEANING ROBOT

CROSS-REFERENCE TO RELATED APPLICATIONS

This application claims the priority benefit of Korean Patent Application No. 10-2013-89652, filed on Jul. 29, 2013 in the Korean Intellectual Property Office, the disclosure of which is incorporated herein by reference.

BACKGROUND

1. Field

The following description relates to a cleaning robot, and more particularly, to a cleaning robot that determines a restricted area and a focused cleaning area of the cleaning robot by detecting a user's motion.

2. Description of the Related Art

A cleaning robot is a device that travels a space to be cleaned to automatically clean the space to be cleaned by inhaling foreign substances including dust from a floor without user manipulation. That is, the cleaning robot cleans the space to be cleaned while traveling the space to be cleaned.

In the cleaning robot according to the related art, an entry prevention tape is attached to the floor with respect to a restricted area which the cleaning robot is prohibited from entering, such as stairs or a veranda. However, setting the restricted area of the cleaning robot using the entry prevention tape in this way causes discomfort and the inconvenience of attaching and re-attaching the entry prevention tape by the user when the user wants to change the restricted area.

Also, in the cleaning robot according to the related art, when there is an area to be more intensely cleaned or to be first cleaned by the user, there are inconveniences that the cleaning robot should be manually manipulated and should be moved to the area to be more intensely cleaned or to be first cleaned and then focused cleaning instructions should be given to the cleaning robot.

SUMMARY

Additional aspects and/or advantages will be set forth in part in the description which follows and, in part, will be apparent from the description, or may be learned by practice of the disclosure.

Therefore, it is an aspect of the present disclosure to provide a cleaning robot that is capable of determining a restricted area and a focused cleaning area of the cleaning robot by detecting a user's voice or motion or in which the restricted area and the focused cleaning area may be easily set using a portable mobile terminal.

Additional aspects of the disclosure will be set forth in part in the description which follows and, in part, will be apparent from the description, or may be learned by practice of the disclosure.

In accordance with one aspect of the present disclosure, a cleaning robot that performs cleaning while travelling a space to be cleaned, the cleaning robot includes: a travelling unit that moves the cleaning robot; a cleaning unit that cleans the space to be cleaned; an image capturing unit that captures an image viewed from the cleaning robot; a voice input unit to which a user's voice instructions are input; and a controller that obtains the user's motion instructions through the image capturing unit when the user's voice instructions are input through the voice input unit and determines a restricted area and/or a focused cleaning area to based on the user's motion instructions.

The voice input unit may include at least three microphones to which the user's voice instructions are input.

The controller may estimate a position of a user based on a difference in times at which the user's voice instructions are input to the at least three microphones.

The controller may control the travelling unit to rotate the cleaning robot so that the image capturing unit is directed toward the position of the user.

The image capturing unit may include a camera that captures a two-dimensional image of the user and an infrared sensor that obtains distance information of the user captured by the camera.

The controller may detect a motion of the user based on the image of the user captured by the image capturing unit and the distance information of the user obtained by the image capturing unit.

The controller may detect a hand and a shoulder of the user from the image of the user and may determine coordinates of the hand and the shoulder of the user based on the distance information of the user.

The controller may determine an area instructed by the user based on the coordinates of the hand and the shoulder of the user and may determine the area instructed by the user as the restricted area and/or the focused cleaning area.

In accordance with another aspect of the present disclosure, a method of controlling a cleaning robot that performs cleaning while travelling about a space to be cleaned, the method includes: when voice instructions are input from a user, obtaining an image of the user; obtaining motion of the user based on the image; an determining a restricted area in which entry of the cleaning robot is prohibited and/or a focused cleaning area to be intensely cleaned by the cleaning robot based on the user's voice instructions and the image of the user.

The obtaining of the image may include: determining a position of the user based on a difference in times at which the user's voice instructions are input to a plurality of microphones; rotating the cleaning robot toward the position of the user; obtaining an image of the user; radiating infrared rays toward the user; and obtaining distance information of the user based on the infrared rays reflected from the user.

The obtaining of the motion of the user may include: detecting a hand and a shoulder of the user from the image of the user; and determining coordinates of the hand and the shoulder of the user using distance information of the user.

The determining of the restricted area and/or the focused cleaning area may include: determining an area instructed by the user based on the coordinates of the hand and the shoulder of the user; and determining the area instructed by the user as the restricted area and/or the focused cleaning area.

The method may further include: displaying an image of the space to be cleaned; and receiving the restricted area and/or the focused cleaning area from the user with respect to the image of the space to be cleaned.

The method may further include determining coordinates of the focused cleaning area and/or the restricted area in the space to be cleaned based on the coordinates of the focused cleaning area and/or the restricted area input with respect to the image of the space to be cleaned.

The method may further include displaying an image of the restricted area and/or the focused cleaning area over the image of the space to be cleaned.

In accordance with still another aspect of the present disclosure, an auto-cleaning system includes: a cleaning robot that performs cleaning while travelling about a space to be cleaned; and a portable mobile terminal that controls the cleaning robot remotely, wherein, when focused cleaning area input instructions and/or restricted area input instructions are input from a user, the cleaning robot captures an image of the space to be cleaned and transmits the image of the space to be cleaned to the portable mobile terminal, and when the image of the space to be cleaned is received, the portable mobile terminal displays the image of the space to be cleaned and receives a focused cleaning area and/or a restricted area, from the user.

The cleaning robot may include an image capturing unit that captures an image of the space to be cleaned and receives motion instructions of the user and a voice input unit that receives voice instructions of the user, and the cleaning robot may determine the restricted area and/or the focused cleaning area based on the voice instructions input through the voice input unit and the motion instructions input through the image capturing unit.

When the voice instructions are input through the voice input unit, the cleaning robot may rotate toward the user and may receive the motion instructions through the image capturing unit.

The portable mobile terminal may include a touch screen panel on which the image of the space to be cleaned is displayed and manipulation instructions are received from the user, and when the focused cleaning area and/or the restricted area is input through the touch screen panel, the focused cleaning area and/or the restricted area may be overlappingly displayed on the image of the space to be cleaned through the touch screen panel.

The portable mobile terminal may determine absolute coordinates in the space to be cleaned that correspond to the focused cleaning area and/or the restricted area.

The portable mobile terminal may determine image coordinates of the focused cleaning area and/or the restricted area from the touch screen panel, may determine relative coordinates of the focused cleaning area and/or the restricted area in which the cleaning robot is set as an origin, based on the image coordinates, and may determine absolute coordinates of the focused cleaning area and/or the restricted area in the space to be cleaned, based on the relative coordinates and a position of the cleaning robot.

In the cleaning robot in accordance with one aspect of the present disclosure, the cleaning robot may receive the restricted area and the focused cleaning area through voice and motion of the user.

In the cleaning robot in accordance with another aspect of the present disclosure, the cleaning robot may receive the restricted area and the focused cleaning area only by simple manipulation through the portable mobile terminal of the user.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
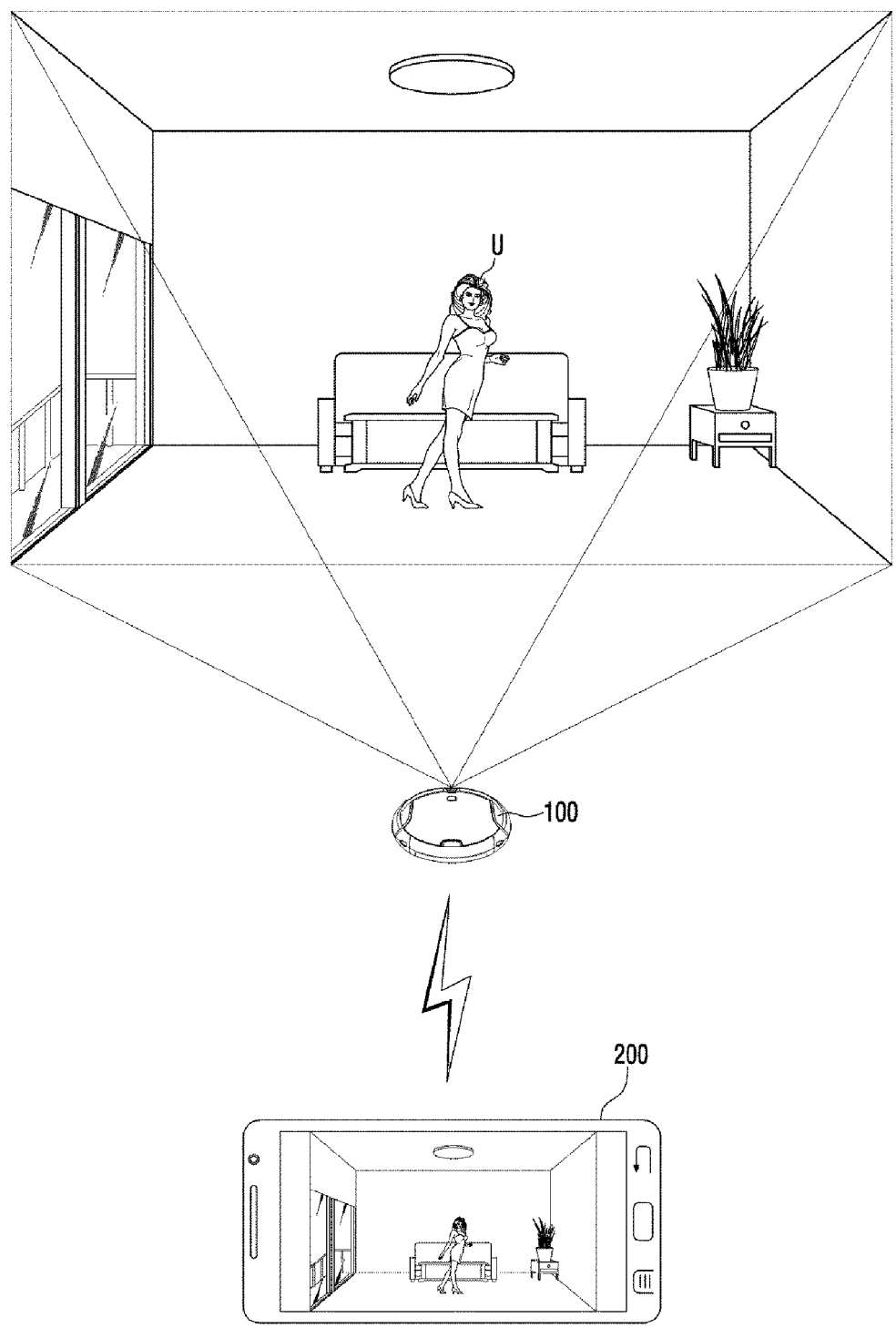
FIG. 1 schematically illustrates a cleaning robot and a portable mobile terminal in accordance with an embodiment of the present disclosure.

Configurations shown in one or more embodiments and the drawings of the present disclosure are merely exemplary embodiments of the disclosed disclosure, and it should be understood that there are various modified examples that may replace embodiments and the drawings of the present disclosure at the time of filing of the present application.

Reference will now be made in detail to one or more embodiments of the present disclosure, examples of which are illustrated in the accompanying drawings, wherein like reference numerals refer to like components throughout.

FIG. 1 schematically illustrates a cleaning robot and a portable mobile terminal in accordance with an embodiment of the present disclosure.

A cleaning robot 100 illustrated in FIG. 1 is a device that cleans dust from a floor while traveling a space to be cleaned without user manipulation. Also, the cleaning robot 100 receives manipulation instructions from a user U such as a user's motion or voice and performs cleaning according to the user's manipulation instructions.

In detail, the cleaning robot 100 captures an image including the user U and the space to be cleaned using an image capturing unit, such as a camera or video camera, and analyzes a user's motion included in the captured image so as to detect manipulation instructions to be instructed by the user U. The image may include other objects such as a sofa S and a table T. When the manipulation instructions of the user U are detected, the cleaning robot 100 cleans the space to be cleaned according to the detected manipulation instructions. Also, the cleaning robot 100 transmits the captured image and the detected manipulation instructions to a portable mobile terminal 200 of the user U so that the user U may check an operation of the cleaning robot 100. In addition, the user U may check the operation of the cleaning robot 100 through the portable mobile terminal 200 and may input the manipulation instructions to the cleaning robot 100 through the portable mobile terminal 200.

Figure 2A:
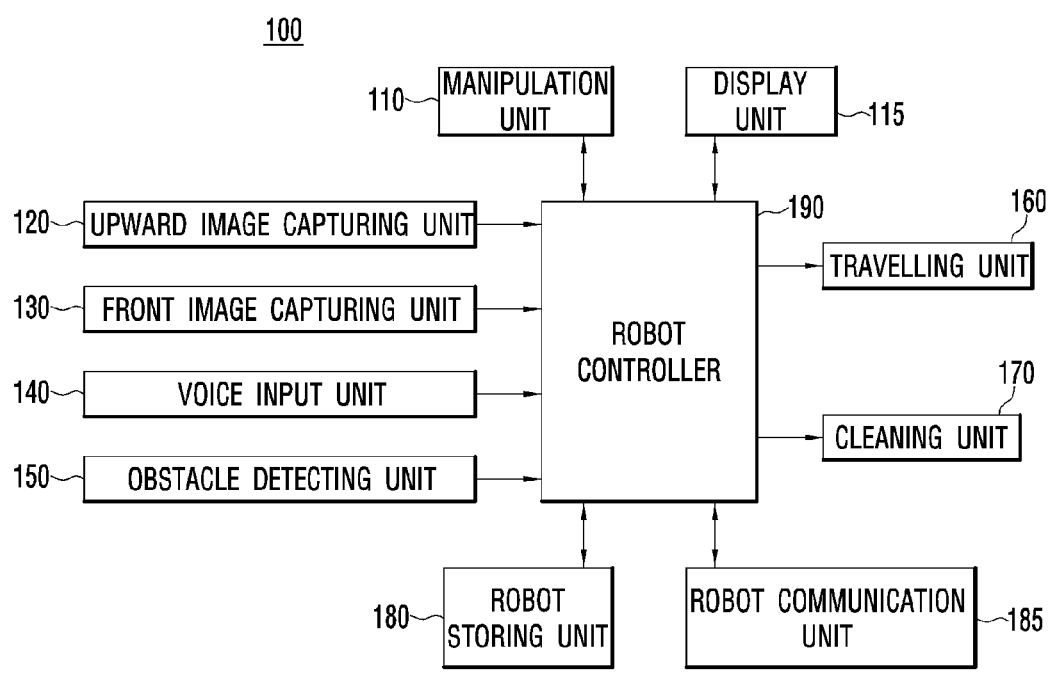
FIG. 2A is a block diagram of control flow of the cleaning robot illustrated in FIG. 1.
Figure 2B:
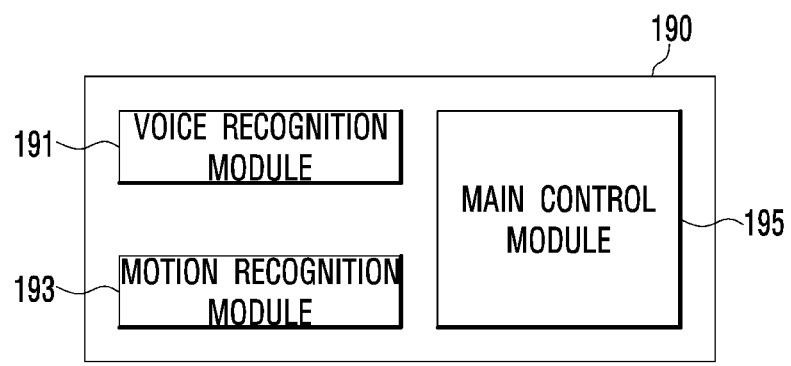
FIG. 2B is a block diagram illustrating the configuration of a controller of the cleaning robot of FIG. 1.
Figure 3:
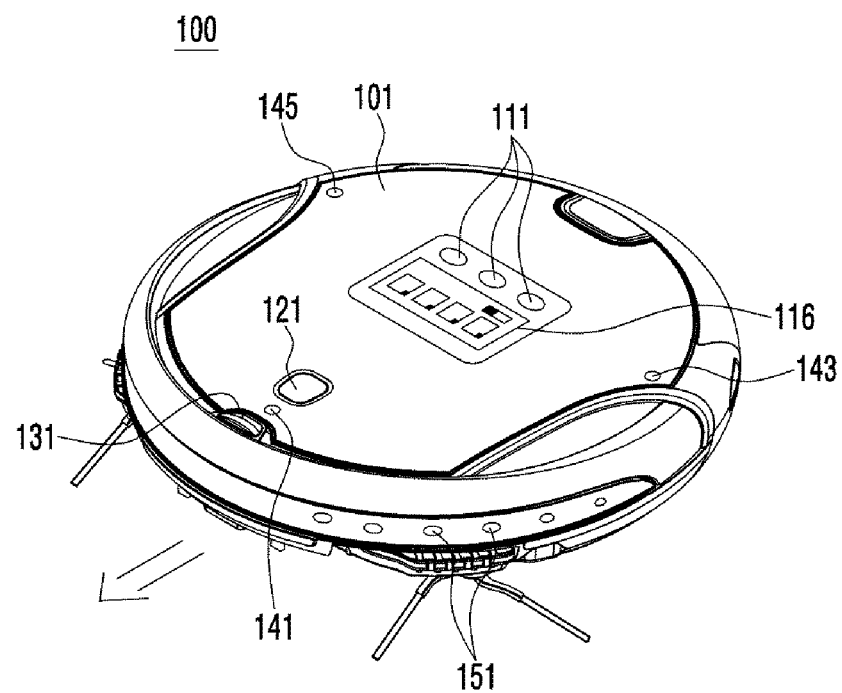
FIG. 3 is a perspective view illustrating the exterior of the cleaning robot of FIG. 1.
Figure 4:
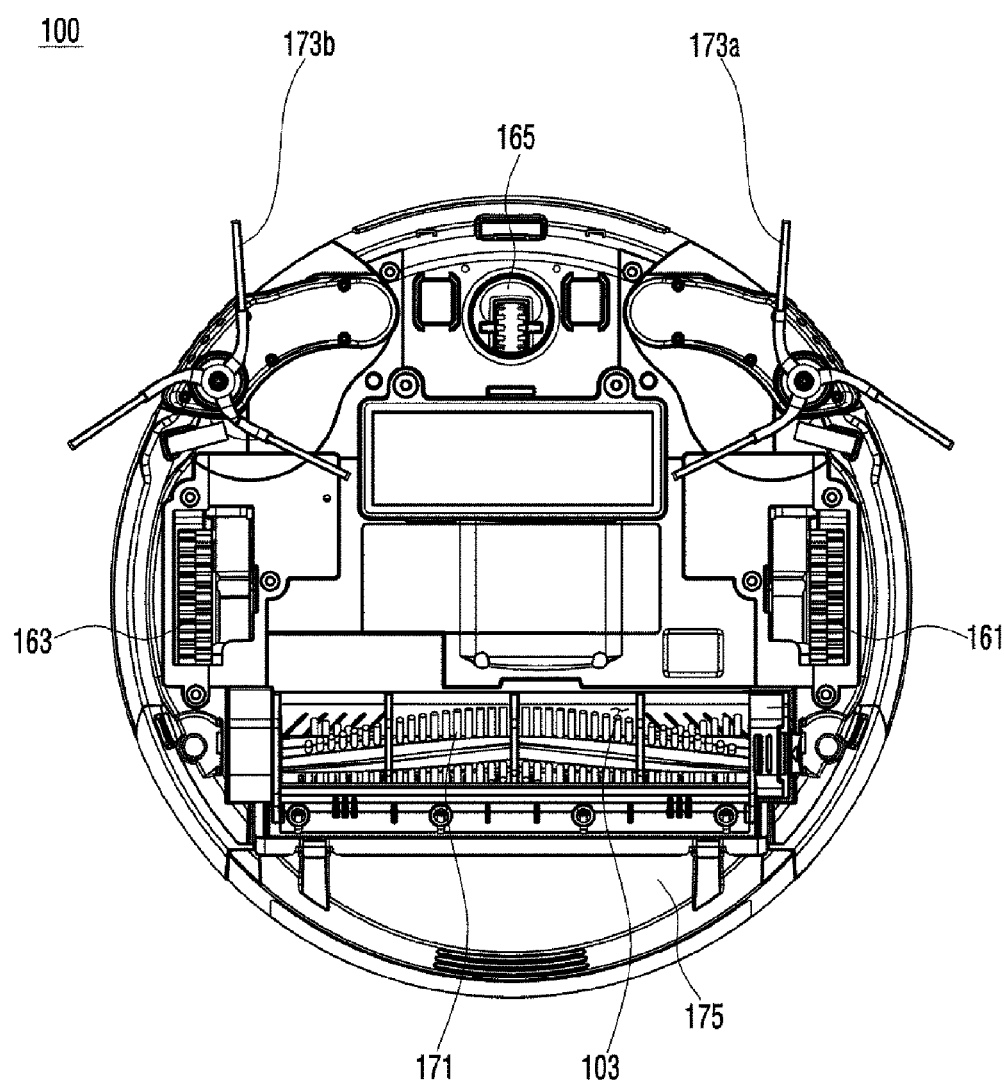
FIG. 4 is a bottom view illustrating the bottom of the cleaning robot of FIG. 1.

FIG. 2A is a block diagram of control flow of the cleaning robot illustrated in FIG. 1, FIG. 2B is a block diagram illustrating the configuration of a controller of the cleaning robot of FIG. 1, FIG. 3 is a perspective view illustrating the exterior of the cleaning robot of FIG. 1, and FIG. 4 is a bottom view illustrating the bottom of the cleaning robot of FIG. 1.

Referring to FIGS. 2A through 4, the cleaning robot 100 includes a manipulation unit 110 that receives the manipulation instructions to the cleaning robot 100 from the user U, a display unit 115 that displays information including operating information of the cleaning robot 100 to the user U, an upward image capturing unit 120 that captures an image in an upward direction of the cleaning robot 100, an image capturing unit 130 that captures an image viewed from the cleaning robot 100, a voice input unit 140 that receives a user's voice instructions, an obstacle detecting unit 150 that detects an obstacle in the space to be cleaned, a travelling unit 160 that moves the cleaning robot 100, a cleaning unit 170 that cleans the space to be cleaned, a robot storing unit 180 that stores programs and data for an operation of the cleaning robot 100, a robot communication unit 185 that communicates with the portable mobile terminal (see 200 of FIG. 1), and a robot controller 190 that controls the operation of the cleaning robot 100.

The manipulation unit 110 may include one or more manipulation buttons 111 to which the manipulation instructions to the cleaning robot 100 are input from the user U. The manipulation buttons 111 may include a cleaning mode selection button to select a cleaning mode of the cleaning robot 100, an operation/stop instruction button to instruct an operation and stop of the cleaning robot 100, and a charge return instruction button to instruct return to a charge station (not shown). In addition to the manipulation buttons 111, other types of a user interface such as a simple button, a membrane switch or a touch screen may be employed.

The display unit 115 includes a display panel 116 on which the information including the operating information of the cleaning robot 100 is displayed to the user U. The operating information of the cleaning robot 100 including a current time, the state of a battery, and a cleaning mode may be displayed on the display panel 116. As the display panel 116, a liquid crystal display (LCD) panel or a light emitting diode (LED) panel may be employed.

The upward image capturing unit 120 may include a two-dimensional camera 121 that is disposed on a top surface 101 of the cleaning robot 100 and captures an image in an upward direction of the cleaning robot 100, i.e., an image of a ceiling of the space to be cleaned. In addition, the upward image capturing unit 120 may include a graphic processor (not shown) that processes the image captured by the two-dimensional camera 121 as needed. The graphic processor (not shown) may perform simple image processing like changing the size or resolution of the image captured by the two-dimensional camera 121.

The image capturing unit 130 may include a three-dimensional camera 131 that is disposed at the front portion of the cleaning robot 100 and captures a three-dimensional image viewed from the cleaning robot 100. The three-dimensional image includes information regarding a distance from a two-dimensional image of an object to be captured to the object to be captured. As the three-dimensional camera 131, a stereo camera module or a depth sensor module may be employed.

The stereo camera module includes a plurality of two-dimensional cameras and determines distance information regarding the object to be captured using a difference between images captured by the plurality of two-dimensional cameras. Also, the stereo camera module outputs information regarding a distance between one of the images captured by the plurality of two-dimensional cameras and the object to be captured.

The depth sensor module includes a two-dimensional camera that captures an image of the object to be captured and an infrared sensor that radiates infrared rays toward the object to be captured and detects the size of the infrared rays reflected from the object to be captured, thereby measuring a distance to the object to be captured in a two-dimensional image. Also, the depth sensor module outputs the image captured by the two-dimensional camera and distance information obtained by the infrared sensor.

The image capturing unit 130 may further include a graphic processor that processes the three-dimensional image captured by the three-dimensional camera 131 as needed.

The voice input unit 140 includes a plurality of microphones 141, 143, and 145 that obtain the user's voice and determine the direction of the user U. In detail, the voice input unit 140 includes a front microphone 141 disposed at the front portion of a top surface of the cleaning robot 100, a left microphone 143 disposed at the left portion of the top surface of the cleaning robot 100, and a right microphone 145 disposed at the right portion of the top surface of the cleaning robot 100. These microphones 141, 143, and 145 convert the user's voice signals into electrical signals and output the electrical signals. In this case, the microphones 141, 143, and 145 may determine the direction of the user U using, for example, a difference in times at which the user's voice signals are input to the three microphones 141, 143 and 145 and amplitudes of the voice signals.

The obstacle detecting unit 150 includes a plurality of infrared sensors 151 that radiate infrared rays and measure the size of the infrared rays reflected from an obstacle, thereby determining the presence of the obstacle and a distance from the obstacle to the object to be captured. The plurality of infrared sensors 151 may be installed at the front portion and the right portion and left portions of the cleaning robot 100 at regular intervals, thereby determining the position of the obstacle. That is, when the infrared sensor 151 placed at the front portion of the cleaning robot 100 detects the obstacle, it may be determined that the obstacle is present at the front portion of the cleaning robot 100, and when the infrared sensor 151 placed at the right portion of the cleaning robot 100 detects the obstacle, it may be determined that the obstacle is present at the right portion of the cleaning robot 100.

The travelling unit 160 includes a plurality of travelling wheels 161 and 163 that move the cleaning robot 100, and a roller 165 that assists with the movement of the cleaning robot 100.

The plurality of travelling wheels 161 and 163 are disposed at the right and left edge portions of the bottom surface of the cleaning robot 100 so that the cleaning robot 100 may move forward or backward or may rotate. For example, when the plurality of travelling wheels 161 and 163 are rotated forward, the cleaning robot 100 moves forward, and when the plurality of travelling wheels 161 and 163 are rotated backward, the cleaning robot 100 moves backward. Also, when the plurality of travelling wheels 161 and 163 are rotated in different directions, the cleaning robot 100 may rotate to the left or to the right on the spot.

The roller 165 is installed at the front portion of the bottom surface of the cleaning robot 100 and rotates according to a movement direction of the cleaning robot 100. Also, the roller 165 may allow the cleaning robot 100 to be maintained in a stable position.

The cleaning unit 170 includes a main brush 171 that scatters dust in the space to be cleaned, a plurality of side brushes 173a and 173b that guide dust in the space to be cleaned toward the main brush 171, and a dust box 175 that inhales and stores dust scattered by the main brush 171.

The main brush 171 is disposed at a dust inhalation hole 103 formed in the bottom surface of the cleaning robot 100. Also, the main brush 171 scatters dust in the space to be cleaned into the dust inhalation hole 103 while rotating about a rotation shaft parallel to the cleaning robot 100.

The plurality of side brushes 173a and 173b are installed at the left and right edge portions of the front of the bottom surface of the cleaning robot 100. That is, the side brushes 173a and 173b are installed approximately at a front of the plurality of travelling wheels 161 and 163. The side brushes 173a and 173b sweep dust in a cleaning area that may not be cleaned by the main brush 171 and guide dust toward the main brush 171 while rotating about the rotation shaft perpendicular to the cleaning robot 100. Also, the side brushes 173a and 173b not only may rotate on the spot but also are installed to protrude toward the outside of the cleaning robot 100 so that an area to be cleaned by the cleaning robot 100 may be enlarged.

The robot storing unit 180 may include a non-volatile memory (not shown), such as a magnetic disk or a solid state disk, in which a control program or control data to control an operation of the cleaning robot 100 is permanently stored, and a volatile memory (not shown), such as a dynamic random access memory (D-RAM) or a static random access memory (S-RAM), in which temporary data generated when the operation of the cleaning robot 100 is controlled is temporarily stored.

The robot communication unit 185 may include a wireless communication module (not shown) that performs wireless communication with the portable mobile terminal (see 200 of FIG. 1) or the charge station (not shown) using a wireless communication method, such as wireless fidelity (Wi-Fi), Bluetooth, Zigbee, or near field communication (NFC).

The robot controller 190 includes a voice recognition module 191 that detects the user's manipulation instructions through the user's voice based on the user's voice signals obtained by the voice input unit 140, a motion recognition module 193 that detects the user's manipulation instructions according to the user's motion based on the three-dimensional image captured by the image capturing unit 130, and a main control module 195 that controls the operation of the cleaning robot 100 according to the user's manipulation instructions.

The voice recognition module 191 detects the user's manipulation instructions by comparing voice instructions stored according to various manipulation instructions with the voice instructions input by the voice input unit 140. Here, the cleaning robot 100 may previously receive the voice instructions corresponding to the manipulation instructions from the user U and may store the voice instructions, so as to improve a probability that the voice recognition module 191 will recognize the user's voice instructions.

The motion recognition module 193 detects positions of particular portions of the user U, such as a hand and a shoulder of the user U from the three-dimensional image and determines a trajectory of the hand using the detected positions of the hand and the shoulder. The motion recognition module 193 detects the manipulation instructions intended by the user U by comparing the determined trajectory of the hand with motion instructions stored according to various manipulation instructions. In addition, the motion recognition module 193 may detect the position of the space to be cleaned instructed by the user's hand using the detected positions of the hand and the shoulder.

The main control module 195 controls the operation of the travelling unit 160 and the operation of the cleaning unit 170 based on the user's manipulation instructions input through the manipulation unit 110, the image capturing unit 130 and the voice input unit 140 and outputs of the upward image capturing unit 120 and the obstacle detecting unit 150. For example, when cleaning instructions are input through the manipulation unit 110, the controller 190 controls the travelling unit 160 so that the cleaning robot 100 may travel along a predetermined travelling path, and the controller 190 controls the cleaning unit 170 so that the cleaning robot 100 may remove dust on a travelling path along which the cleaning robot 100 travels.

The controller 190 may include a microprocessor that performs an arithmetic operation on the control program and data input according to the control program stored in the robot storing unit 180 and outputs the result of the arithmetic operation. Also, the controller 190 may include a general processor that performs all operations, or a plurality of processors that perform a specialized function, such as graphic processors or communication processors.

Figure 5:
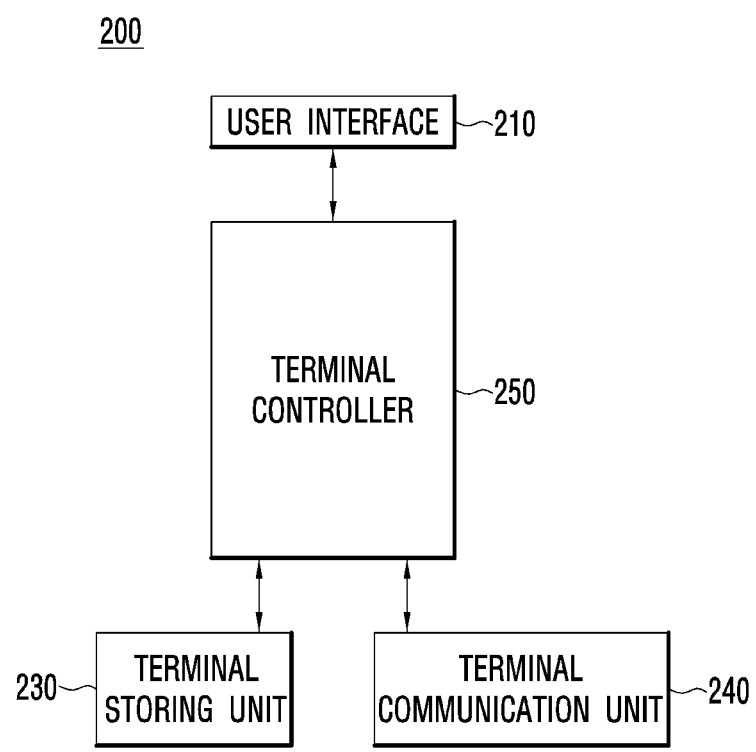
FIG. 5 is a block diagram illustrating control flow of the portable mobile terminal illustrated in FIG. 1.
Figure 6:
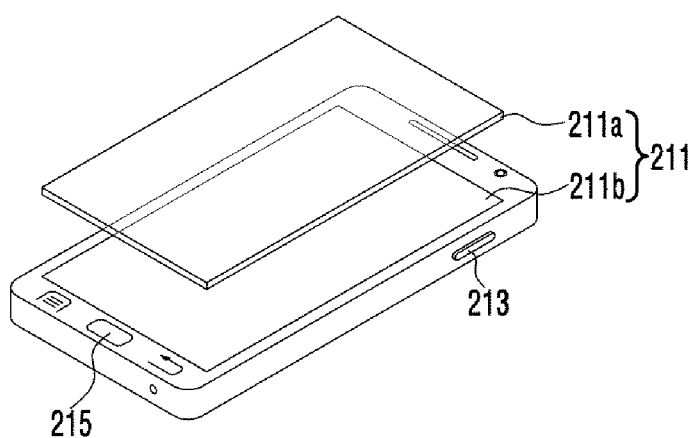
FIG. 6 is a perspective view illustrating the exterior of the portable mobile terminal of FIG. 1.

FIG. 5 is a block diagram illustrating control flow of the portable mobile terminal illustrated in FIG. 1, and FIG. 6 is a perspective view illustrating the exterior of the portable mobile terminal of FIG. 1.

Referring to FIGS. 5 and 6, the portable mobile terminal 200 includes a user interface 210 that receives the manipulation instructions from the user U and displays a screen corresponding to the user's manipulation instructions, a terminal storing unit 230 in which a program and data to control the portable mobile terminal 200 are stored, a terminal communication unit 240 that communicates with the cleaning robot (see 100 of FIG. 1), and a terminal controller 250 that controls an operation of the portable mobile terminal 200.

The user interface 210 includes a touch pad 211a that receives the user's manipulation instructions through the user's touch motion, a display panel 211b on which information corresponding to the manipulation instructions input to the touch pad 211a is displayed, a power button 213 that receives power on/off instructions of the portable mobile terminal 200, and a home button 215 that converts the screen displayed on the display panel 211b into a main screen. Here, as the display panel 211b, an LCD panel or an LED panel may be employed.

The touch pad 211a and the display panel 211b are formed integrally with each other and constitute a touch screen panel (TSP) 211. In the TSP 211, the transparent touch pad 211a may be installed on the display panel 211b, a screen on which the manipulation instructions that may be selected by the user U are displayed may be displayed on the display panel 211b and coordinates touched by the user U may be detected through the touch pad 211a. When the user U touches the TSP 211 according to the screen displayed on the display panel 211b, the portable mobile terminal 200 may recognize the manipulation instructions intended by the user U by comparing the coordinates touched by the user U with coordinates in which the manipulation instructions are displayed.

In addition, the portable mobile terminal 200 may detect a user's touch motion through the touch pad 211a and may recognize the manipulation instructions intended by the user according to the user's detected touch motion.

The terminal storing unit 230 may include a non-volatile memory (not shown), such as a magnetic disk or a solid state disk, in which a control program or control data for controlling an operation of the portable mobile terminal 200 is permanently stored, and a volatile memory (not shown), such as a D-RAM or an S-RAM, in which temporary data generated when the operation of the portable mobile terminal 200 is controlled is temporarily stored.

The terminal communication unit 240 may include a wireless communication module (not shown) that performs wireless communication with the cleaning robot (see 100 of FIG. 1) using a wireless communication method, such as Wi-Fi, Bluetooth, Zigbee, or NFC.

The terminal controller 250 controls the TSP 211 so that the screen displayed on the TSP 211 may be changed according to the manipulation instructions input through the TSP 211 and the information input through the terminal communication unit 240. For example, when the image of the space to be cleaned captured by the cleaning robot 100 is received from the terminal communication unit 240 and image display instructions of the space to be cleaned are input from the user U, the terminal controller 250 displays the received image of the space to be cleaned on the TSP 211.

The configurations of the cleaning robot 100 and the portable mobile terminal 200 illustrated in FIG. 1 have been described above. Hereinafter, a method of setting a focused cleaning area and a restricted area using the cleaning robot 100 and the portable mobile terminal 200 of FIG. 1, in accordance with an embodiment of the present disclosure will be described.

Figure 7:
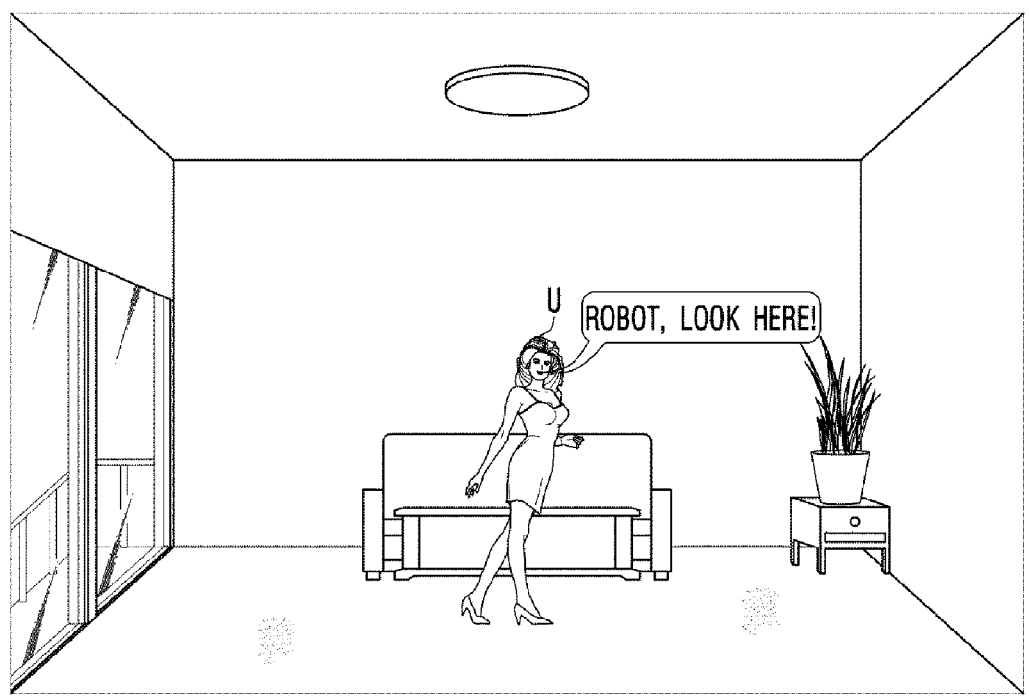
FIG. 7 illustrates the case in which the cleaning robot of FIG. 1 receives voice instructions from a user.
Figure 8A:
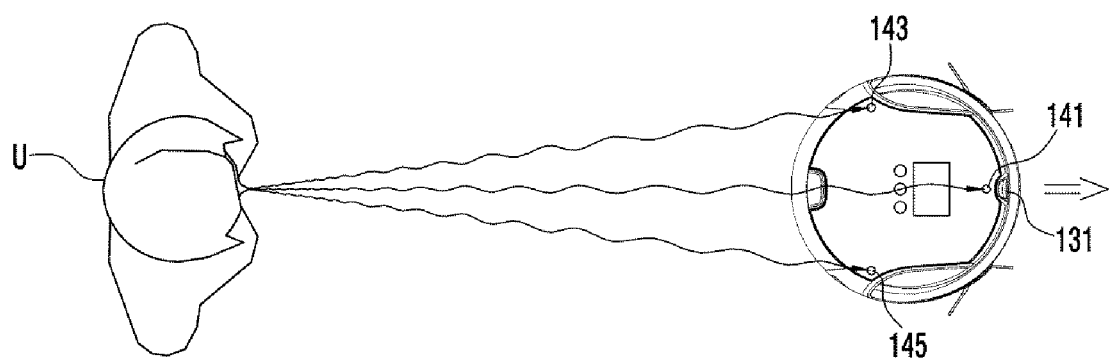
FIGS. 8A, 8B and 8C illustrate the case in which the cleaning robot of FIG. 1 determines a user's position through the user's voice instructions.
Figure 8B:
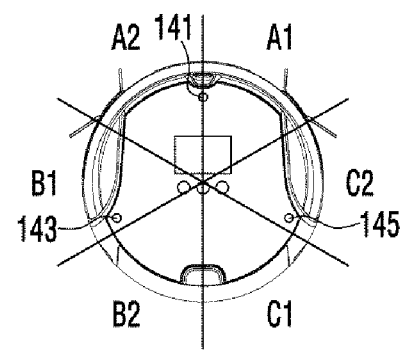
Figure 8C:
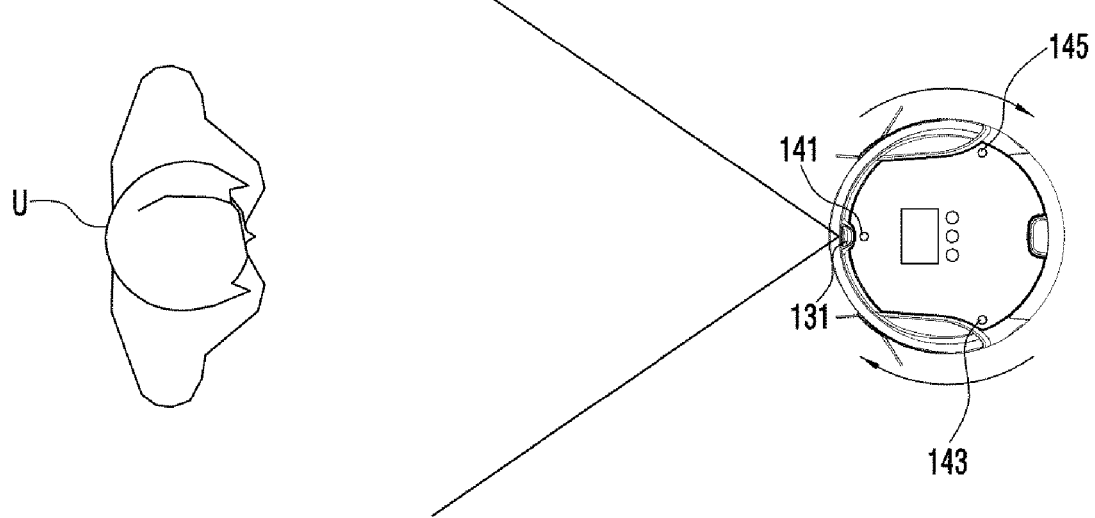

FIG. 7 illustrates the case in which the cleaning robot of FIG. 1 receives voice instructions from the user, and FIGS. 8A, 8B and 8C illustrate the case in which the cleaning robot of FIG. 1 determines a user's position through the user's voice instructions.

As illustrated in FIGS. 7 and 8, when the user U inputs call instructions to the cleaning robot 100 through voice while the cleaning robot 100 performs cleaning in an auto-cleaning mode, the cleaning robot 100 receives voice signals of the user U through the voice input unit (see 140 of FIG. 2A) disposed at the cleaning robot 100 and detects the call instructions of the user U based on the received voice signals. Also, when the call instructions are detected, the cleaning robot 100 rotates toward the user U.

In detail, the cleaning robot 100 may use the voice signals received by at least one of three microphones 141, 143, and 145 included in the voice input unit (see 140 of FIG. 2A) so as to receive the voice signals of the user U. For example, the cleaning robot 100 may use the voice signals received by a front microphone 141 from among the front microphone 141, a left microphone 143 and a right microphone 144 for voice recognition.

Also, when the voice signals of the user U are received, the cleaning robot 100 may analyze the voice signals input through the voice recognition module (see 191 of FIG. 2B) and may detect the call instructions of the user U according to the result of analysis. For example, the cleaning robot 100 compares the voice signals of the user U received by the voice input unit (see 140 of FIG. 2A) with voice signals according to a plurality of manipulation instructions, thereby detecting that the voice signals of the user U are the call instructions.

Also, as a result of analyzing the voice signals of the user U, when it is determined that the voice signals of the user U are the call instructions, the cleaning robot 100 determines a direction of the user U based on the voice signals input to the three microphones 141, 143 and 145 and rotates toward the user U. In detail, the cleaning robot 100 compares input times of the voice signals input to the three microphones 141, 143 and 145 and the amplitudes of the voice signals, thereby estimating the direction of the user U.

For example, when a voice signal is first received by the front microphone 141 and the amplitude of the voice signal input to the front microphone 141 is the largest, the cleaning robot 100 may estimate that the user U is in an area A1 or A2 illustrated in FIG. 8B. Also, when a voice signal is received by the left microphone 143 before the right microphone 145 receives the voice signal and the amplitude of the voice signal input to the left microphone 143 is larger than the amplitude of the voice signal input to the right microphone 145, the cleaning robot 100 may estimate that the user U is in the area A2 of FIG. 8B. In addition, the cleaning robot 100 may estimate the position of the user U based on a difference between a time at which the voice signal is input to the left microphone 143 and a time at which the voice signal is input to the right microphone 145 or a difference between the amplitude of the voice signal input to the left microphone 143 and the amplitude of the voice signal input to the right microphone 145.

As another example, when the voice signals of the user U are input in the order of the left microphone 143, the front microphone 141 and the right microphone 145 and the amplitudes of the voice signals are in the order of the left microphone 143, the front microphone 14 and the right microphone 145, the cleaning robot 100 may determine that the user U is in an area B1 illustrated in FIG. 8B.

When the direction of the user U is determined, the cleaning robot 100 rotates toward the user U, as illustrated in FIG. 8C. In this case, the cleaning robot 100 may rotate in a direction in which rotational displacement is low.

Figure 9:
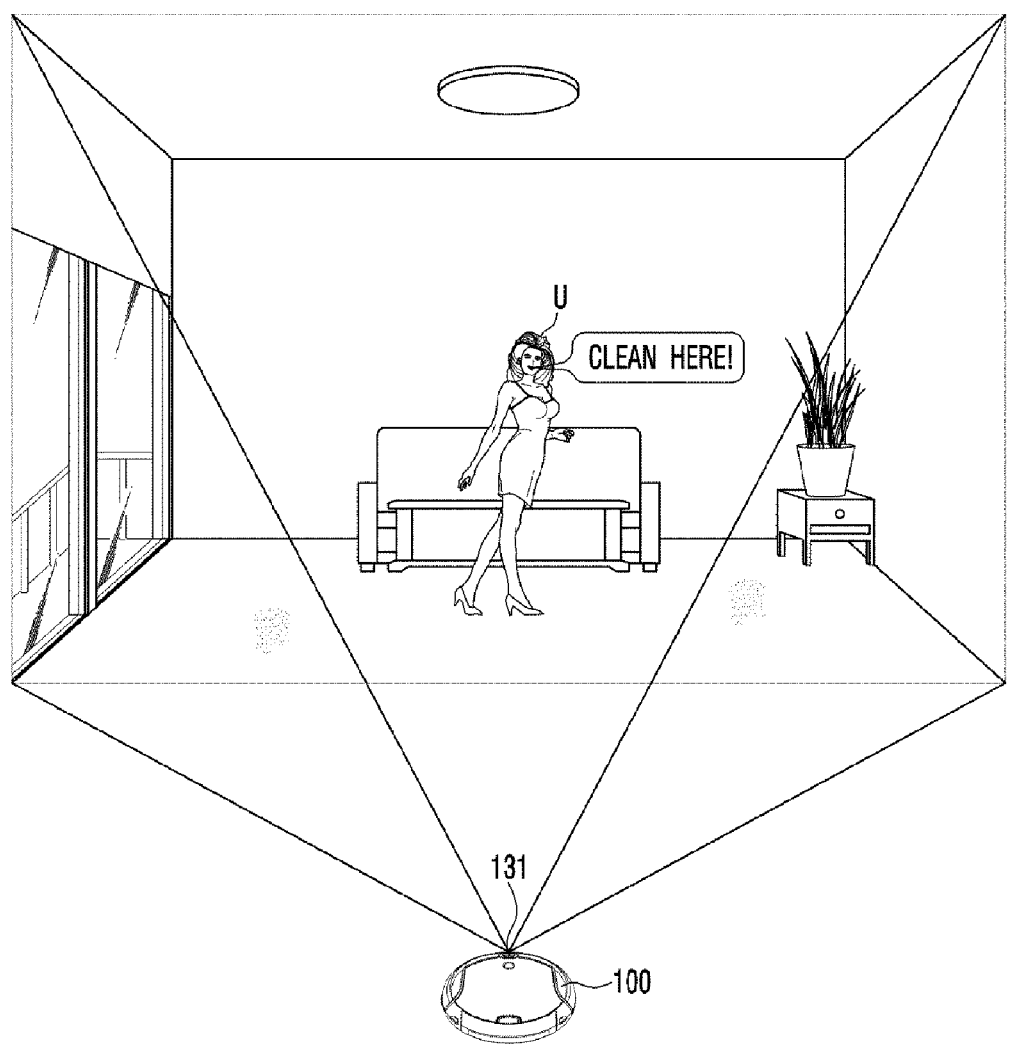
FIG. 9 illustrates the case in which the cleaning robot of FIG. 1 obtains an image and voice of a user.

FIG. 9 illustrates the case in which the cleaning robot of FIG. 1 obtains an image of the user and the user's voice.

When the call instructions are input from the user U, the cleaning robot 100 rotates toward the user U as illustrated in FIG. 9 and obtains two-dimensional images of the user U and the space to be cleaned and distance information using the image capturing unit (see 130 of FIG. 2).

The user U may input cleaning area designating instructions to the cleaning robot 100 through motion or voice. For example, the user U may say "Clean here" while instructing a focused cleaning area to be intensely cleaned or may say "Don't clean here" while instructing a restricted area in which the entry of the cleaning robot 100 is prohibited. In this way, when the user U inputs the cleaning area designating instructions to the cleaning robot 100 through motion or voice, the cleaning robot 100 determines an area instructed by the user U through the motion of the user U and analyzes the voice of the user U, thereby determining manipulation instructions of the user U.

Determining of the manipulation instructions of the user U may be performed by comparing the voice signal input through at least one of a plurality of microphones (see 141, 143 and 145 of FIG. 3) with the voice signal according to a plurality of manipulation instructions and by detecting the cleaning area designating instructions of the user U. For example, the cleaning robot 100 may determine whether the user U instructs the focused cleaning area or the restricted area.

When the cleaning area designating instructions are determined through the voice of the user U, the cleaning robot 10 analyzes the motion of the user U and determines an area instructed by the user U using the two-dimensional image and the distance information obtained by the image capturing unit (see 130 of FIG. 2A).

FIGS. 10A and 10B and FIGS. 11A and 11B illustrate the case in which the cleaning robot of FIG. 1 determines coordinates of an area instructed by the user from the image of the user.

Figure 10A:
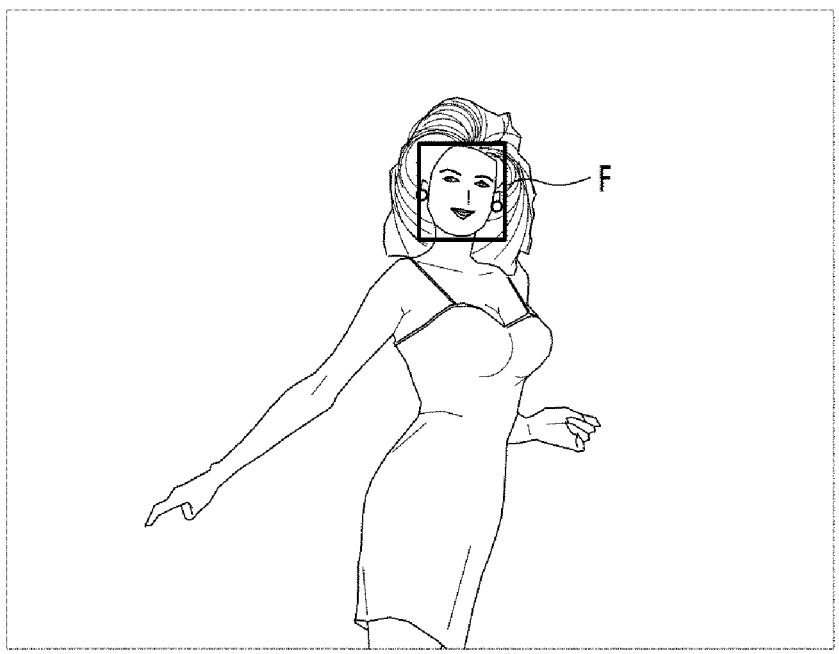
FIGS. 10A and 10B and FIGS. 11A and 11B illustrate the case in which the cleaning robot of FIG. 1 determines coordinates of an area instructed by the user from the image of the user.

As illustrated in FIG. 10A, the cleaning robot 100 detects a face F of the user U from the images of the user U and the space to be cleaned. Detecting the face F may be performed using methods such as a knowledge-based method, whereby detection of components that constitute the face F of a human being, such as symmetric eyes, a nose and a mouth under the eyes, is attempted, an eigenface algorithm, whereby detection of the face F is attempted by approximating an eigenvector regarding an auto-correlation matrix of an image of the face F, a support vector machine (SVM) algorithm, whereby the face F is detected using the SVM, or a boosting approach algorithm, whereby a detection method having a high detection rate is constituted by linearly combining several detection methods having low detection rates. However, the present disclosure is not limited thereto. For example, any method to detect a face F of the user U from the images of the user U may be used.

The face F of the user U is detected so that the cleaning robot 100 may determine the accurate position of the user U and the image of the user U may be used as a criterion to detect particular portions of the user U, such as a hand and a shoulder. In addition, a distance between the user U and the cleaning robot 100 may be determined from a distance between the face F of the user U and the cleaning robot 100.

Figure 10B:
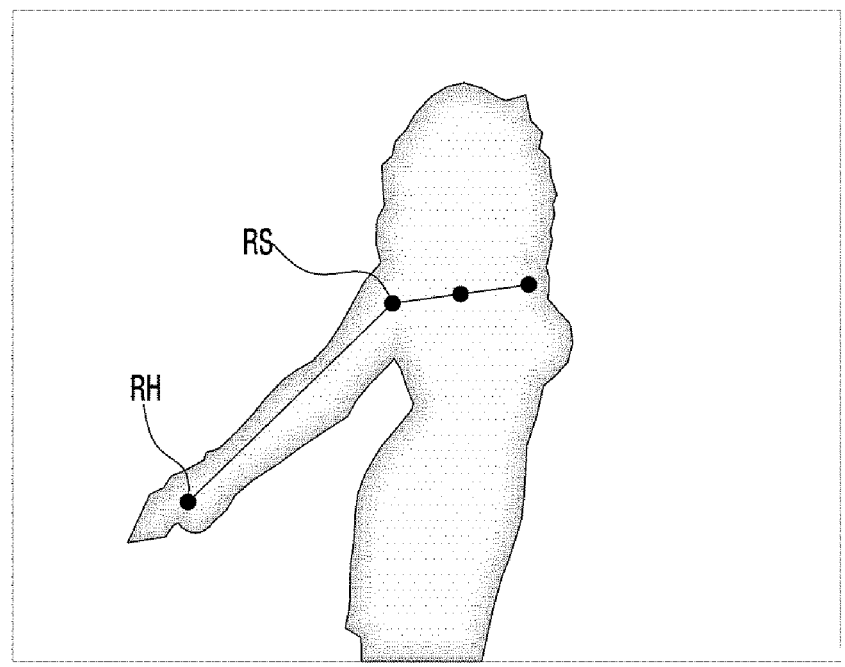

As illustrated in FIG. 10B, after detecting the face F of the user U, the cleaning robot 100 detects the particular portions of the user U, such as a shoulder RS and a hand RH, from the image of the user U based on the position of the face F of the user U.

Figure 11A:
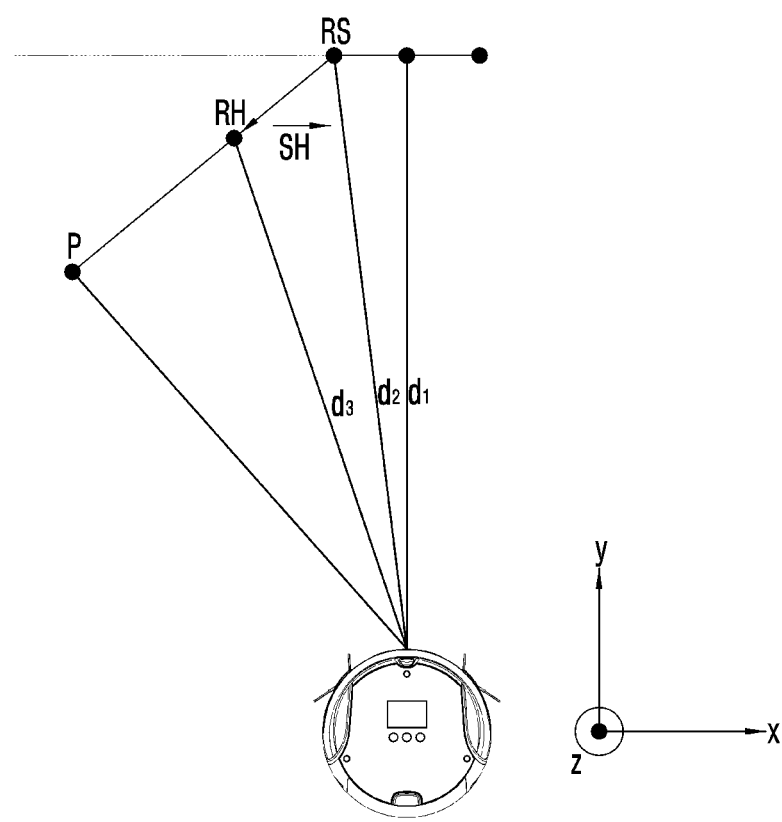

As illustrated in FIG. 11A, when the shoulder RS and the hand RH of the user U are detected from the three-dimensional image of the user U, the cleaning robot 100 may determine a distance d1 between the user U and the cleaning robot 100, a distance d2 between the shoulder RS of the user U and the cleaning robot 100, and a distance d3 between the hand RH of the user U and the cleaning robot 100 using the distance information obtained by the image capturing unit (see 130 of FIG. 2A). Also, the cleaning robot 100 may determine a direction of the user U, a direction of the shoulder RS, and a direction of the hand RH from the two-dimensional image captured by the image capturing unit (see 130 of FIG. 2A).

Also, the cleaning robot 100 may determine three-dimensional relative coordinates of the shoulder RS and the hand RH of the user U based on the distance d1 between the user U and the cleaning robot 100 and the direction of the user U, the distance d2 between the shoulder RS of the user U and the cleaning robot 100 and the direction of the shoulder RS and the cleaning robot 100 and the distance d3 between the hand RH of the user U and the cleaning robot 100 and the direction of the hand RH. Here, the three-dimensional relative coordinates of the shoulder RS and the hand RH of the user U define coordinates in a three-dimensional relative coordinate system in which the position of the cleaning robot 100 is set as an origin. The three-dimensional relative coordinate system defines a coordinate system in which the cleaning robot 100 is set as an origin, a front direction of the cleaning robot 100 from a cleaning floor is set as a +y-axis, a right direction of the cleaning robot 100 from the cleaning floor is set as an +x-axis and an upward direction of the cleaning robot 100 from the cleaning floor is set as a +z-axis.

When the three-dimensional coordinates of the shoulder RS and hand RH of the user U are determined, the cleaning robot 100 determines a direction vector SH toward the hand RH of the user U from the shoulder RS of the user U and determines two-dimensional relative coordinates of the position P instructed by the user U based on the direction vector SH toward the hand RH of the user U from the shoulder RS of the user U and the three-dimensional relative coordinates of the shoulder RS or the hand RH of the user U. In other words, since the position P instructed by the user U is on the cleaning floor, a position in which the direction vector SH toward the hand RH of the user U from the shoulder RS of the user U and the floor of the space to be cleaned cross each other will be the position P instructed by the user U and may be represented as two-dimensional relative coordinates having only an x-axis coordinate and a y-axis coordinate.

Figure 11B:
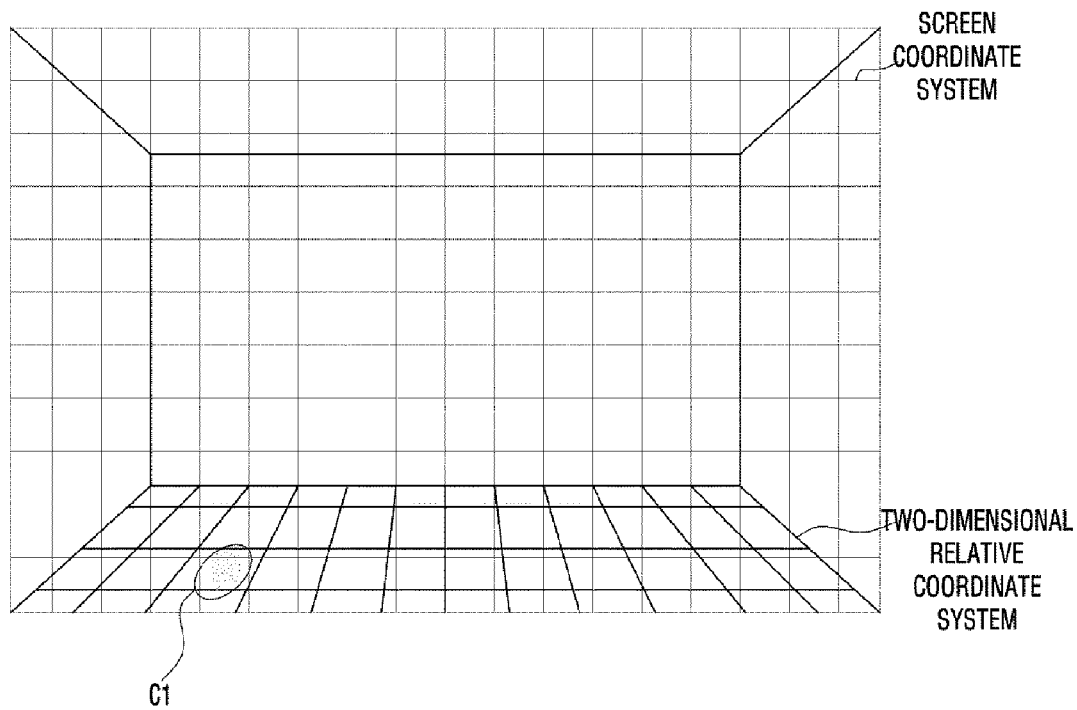

Also, the cleaning robot 100 determines screen coordinates indicating to which position of the area instructed by the user U the two-dimensional image captured by the image capturing unit corresponds (see 130 of FIG. 2A). Since the three-dimensional camera (see 131 of FIG. 3) is fixed to the cleaning robot 100, the two-dimensional relative coordinates indicating the position of the area instructed by the user U on the cleaning floor and the screen coordinates indicating the position of the area instructed by the user U in the two-dimensional image are in one-to-one correspondence, as illustrated in FIG. 11B. That is, the cleaning robot 100 may determine the screen coordinates in the two-dimensional image when the two-dimensional relative coordinates of the area instructed by the user U are obtained.

Also, the cleaning robot 100 determines absolute coordinates of the area instructed by the user U using relative coordinates of the area instructed by the user U and position information of the cleaning robot 100 obtained by the image capturing unit (see 120 of FIG. 2A). Here, the absolute coordinates are coordinates based on a predetermined criterion point, such as an entrance of the space to be cleaned or the charge station (not shown) within the space to be cleaned and are different from the relative coordinates based on the cleaning robot 100.

Figure 12:
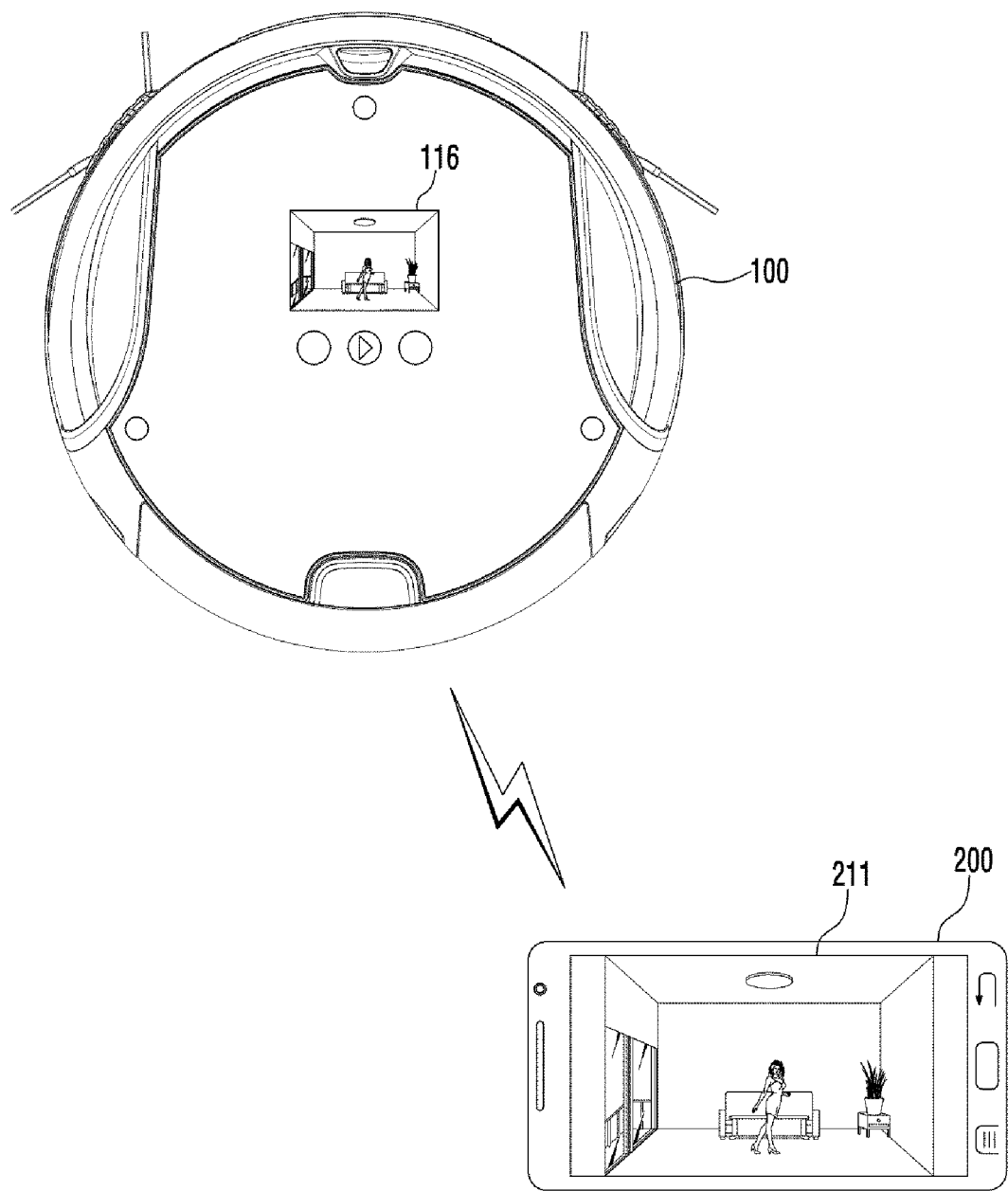
FIG. 12 illustrates the case in which the cleaning robot of FIG. 1 transmits the image of the user and an image of a space to be cleaned and information regarding the area instructed by the user to the portable mobile terminal.
Figure 13:
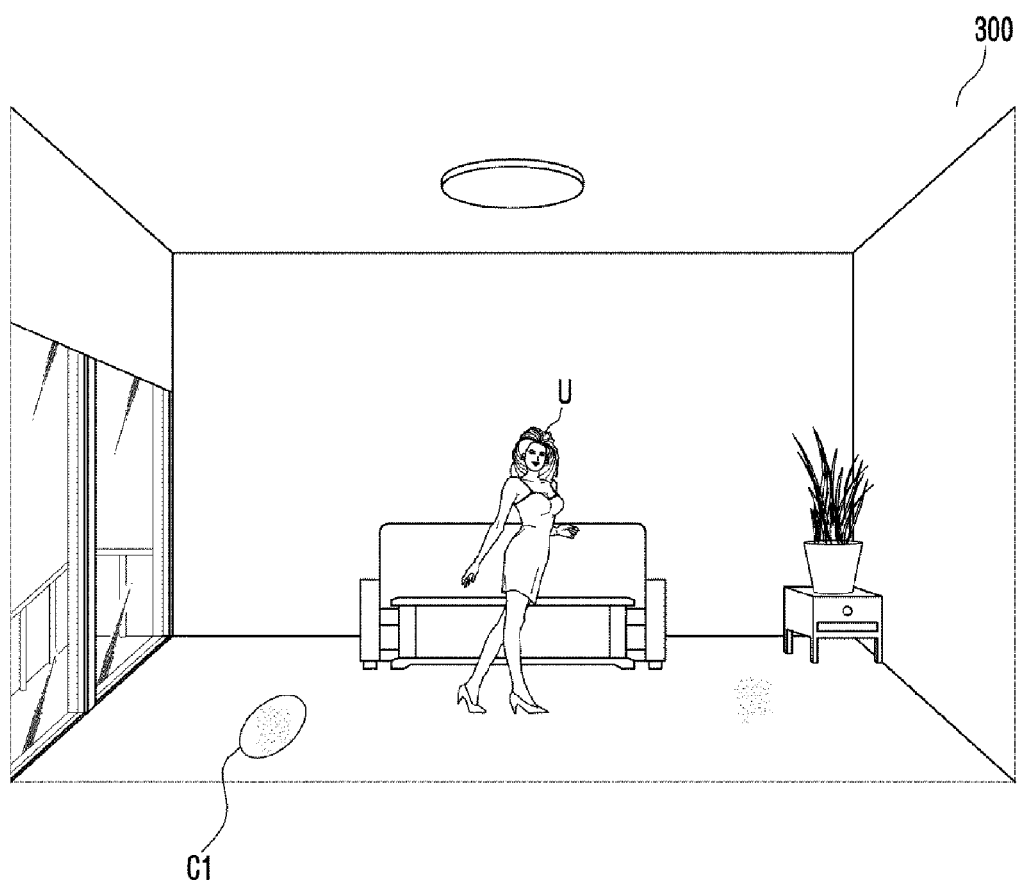
FIG. 13 illustrates the case in which the cleaning robot of FIG. 1 and the portable mobile terminal of FIG. 1 display the image of the space to be cleaned and the information regarding the area instructed by the user.

FIG. 12 illustrates the case in which the cleaning robot of FIG. 1 transmits the image of the user and an image of the space to be cleaned and information regarding the area instructed by the user to the portable mobile terminal, and FIG. 13 illustrates the case in which the cleaning robot of FIG. 1 and the portable mobile terminal of FIG. 1 display the image of the cleaning space and the information regarding the area instructed by the user.

When position information of the area instructed by the user U within the two-dimensional image is determined, the cleaning robot 100 displays the two-dimensional image on the display panel (see 116 of FIG. 3) and overlappingly displays the area instructed by the user U and the type of the area instructed by the user U on the two-dimensional image (whether the area instructed by the user U is the focused cleaning area or the restricted area). Also, the cleaning robot 100 transmits the two-dimensional image, the screen coordinates and the absolute coordinates of the area instructed by the user U, the type of the area instructed by the user U and position information of the cleaning robot 100 in the space to be cleaned to the portable mobile terminal 200 through the communication unit (see 185 of FIG. 2A).

When the two-dimensional image is received, the portable mobile terminal 200 displays the received two-dimensional image on the TSP 211 and overlappingly displays the area instructed by the user U on the two-dimensional image using the screen coordinates of the area instructed by the user U. Here, overlapping display of the area instructed by the user U on the two-dimensional image using the cleaning robot 100 and the portable mobile terminal 200 may be performed using augmented reality. Augmented reality, a kind of virtual reality, is a graphic technique whereby a virtual object or virtual information is synthesized to an actual environment so that the virtual object or virtual information appears as an object in an original environment.

As illustrated in FIG. 13, the cleaning robot 100 and the portable mobile terminal 200 display a cleaning area screen 300 on which the two-dimensional image and the area instructed by the user U, i.e., a first focused cleaning area C1, are displayed. Here, the first focused cleaning area C1 may be overlappingly displayed on the two-dimensional image based on the screen coordinates of the area instructed by the user U and the type of the area instructed by the user U.

The user U may check the position of the focused cleaning area C1 instructed by the user U through the cleaning area screen 300 displayed on the display panel (see 116 of FIG. 12) of the cleaning robot 100 and the TSP 211 of the portable mobile terminal 200.

In addition, the user U may additionally input the focused cleaning area or the restricted area through the TSP (see 211 of FIG. 12) of the portable mobile terminal 200.

Figure 14:
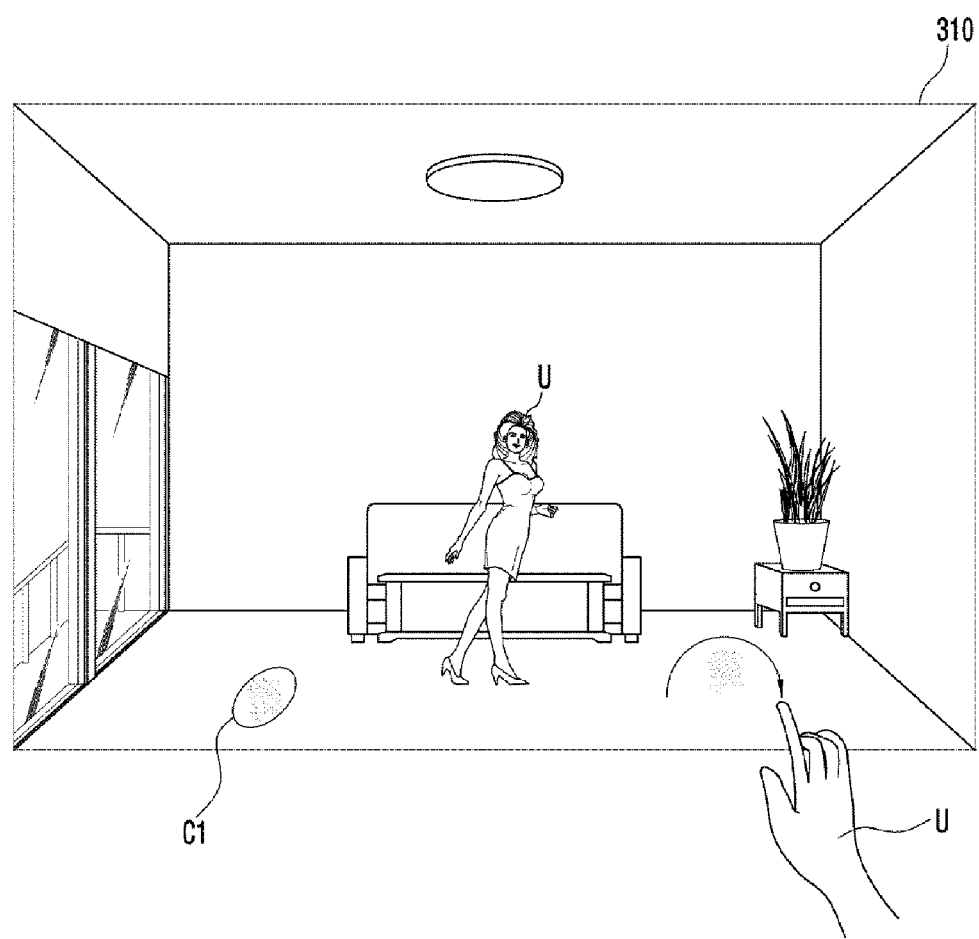
FIG. 14 illustrates the case in which information regarding a focused cleaning area is input to the portable mobile terminal of FIG. 1.
Figure 15:
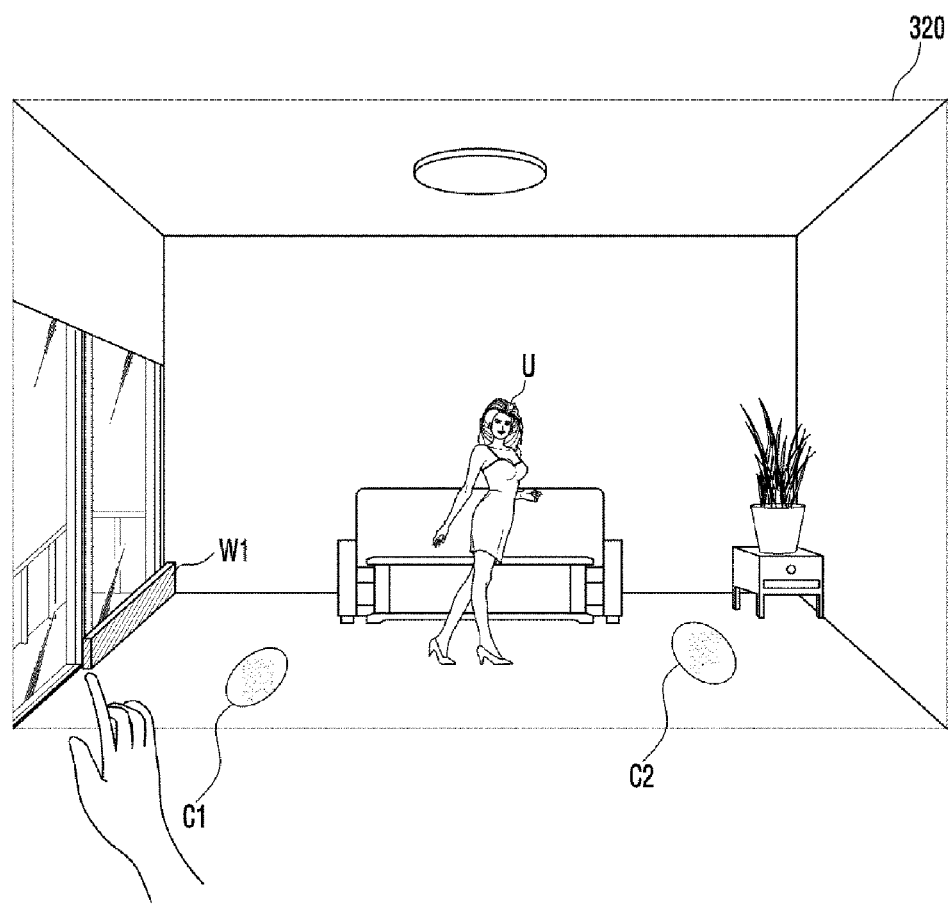
FIGS. 15 and 16 illustrate the case in which information regarding a restricted area is input to the portable mobile terminal of FIG. 1.
Figure 16:
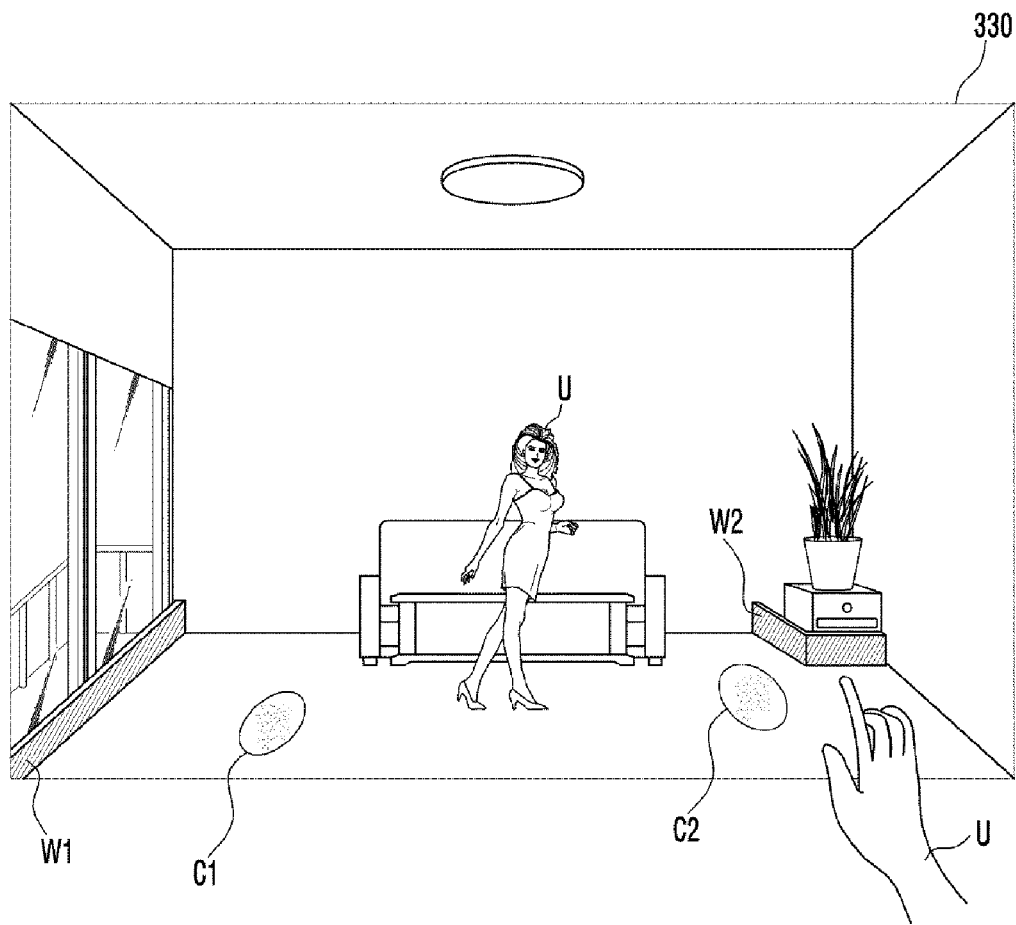

FIG. 14 illustrates the case in which information regarding the focused cleaning area is input to the portable mobile terminal of FIG. 1, and FIGS. 15 and 16 illustrate the case in which information regarding the restricted area is input to the portable mobile terminal of FIG. 1.

As illustrated in FIG. 14, the user U may input focused cleaning area input instructions through motion or voice, may touch a position to be additionally designated as the focused cleaning area on the cleaning area screen 300 displayed on the TSP (see 211 of FIG. 12) of the portable mobile terminal 200 or may touch and drag an area to be designated as the focused cleaning area, thereby designating a second focused cleaning area.

When the user U inputs the second focused cleaning area through the TSP (see 211 of FIG. 12), the portable mobile terminal 200 overlappingly displays a second focused cleaning area C2 on the two-dimensional image. That is, the portable mobile terminal 200 displays a cleaning area screen (not shown) on which the first focused cleaning area C1 and the second focused cleaning area C2 overlap each other on the two-dimensional image of the space to be cleaned, through the TSP (see 211 of FIG. 12).

When the user U wants to input the restricted area, the user U may input restricted area input instructions, may touch a position to be designated as the restricted area on the cleaning area screen 320 displayed on the TSP (see 211 of FIG. 12) of the portable mobile terminal 200, as illustrated in FIGS. 15 and 16, or may touch and drag an area to be designated as the restricted area U1, thereby designating a first restricted area W1 and a second restricted area W2.

When the user U inputs the first restricted area W1 and the second restricted area W2 through the TSP 211, the portable mobile terminal 200 overlappingly displays the first restricted area W1 and the second restricted area W2 on the two-dimensional image. That is, the portable mobile terminal 200 displays the cleaning area screen 330 on which the first focused cleaning area C1, the second focused cleaning area C2, the first restricted area W1 and the second restricted area W2 are displayed on the two-dimensional image of the space to be cleaned using augmented reality, through the TSP (see 211 of FIG. 12).

Figure 17:
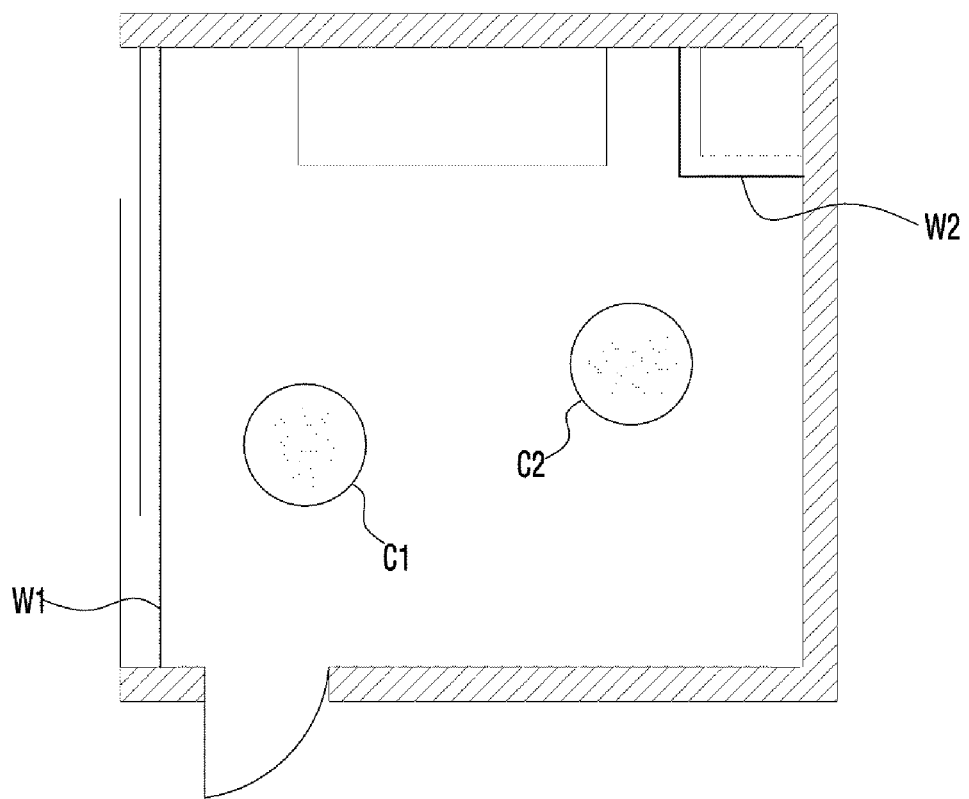
FIG. 17 illustrates a screen on which the portable mobile terminal of FIG. 1 displays the focused cleaning area and the restricted area.

FIG. 17 illustrates a screen on which the portable mobile terminal of FIG. 1 displays the focused cleaning area and the restricted area.

The portable mobile terminal 200 may display positions of the focused cleaning areas C1 and C2 and the restricted areas W1 and W2 in a plan view (map) of the space to be cleaned.

In detail, when the user U completes input of the focused cleaning area and the restricted area, the portable mobile terminal 200 determines two-dimensional relative coordinates of the second focused cleaning area C2, the first restricted area W1 and the second restricted area W2 based on the screen coordinates of the second focused cleaning area C2, the first restricted area W1 and the second restricted area W2. Thereafter, the portable mobile terminal 100 determines absolute coordinates of the second focused cleaning area C2, the first restricted area W1 and the second restricted area W2, i.e., positions of the second focused cleaning area C2, the first restricted area W1 and the second restricted area W2 within the space to be cleaned using the position of the cleaning robot 100 when the cleaning robot 100 captures the two-dimensional image and the two-dimensional relative coordinates of the second focused cleaning area C2, the first restricted area W1 and the second restricted area W2. Also, the portable mobile terminal 200 transmits the absolute coordinates of the second focused cleaning area C2, the first restricted area W1 and the second restricted area W2 to the cleaning robot 100 so that the cleaning robot 100 may detect the focused cleaning areas C1 and C2 and the restricted areas W1 and W2.

When the absolute coordinates of the focused cleaning areas C1 and C2 and the restricted areas W1 and W2 are determined, the portable mobile terminal 200 may display a map of the space to be cleaned and may display positions of the focused cleaning areas C1 and C2 and the restricted areas W1 and W2 on the map of the space to be cleaned.

Figure 18:
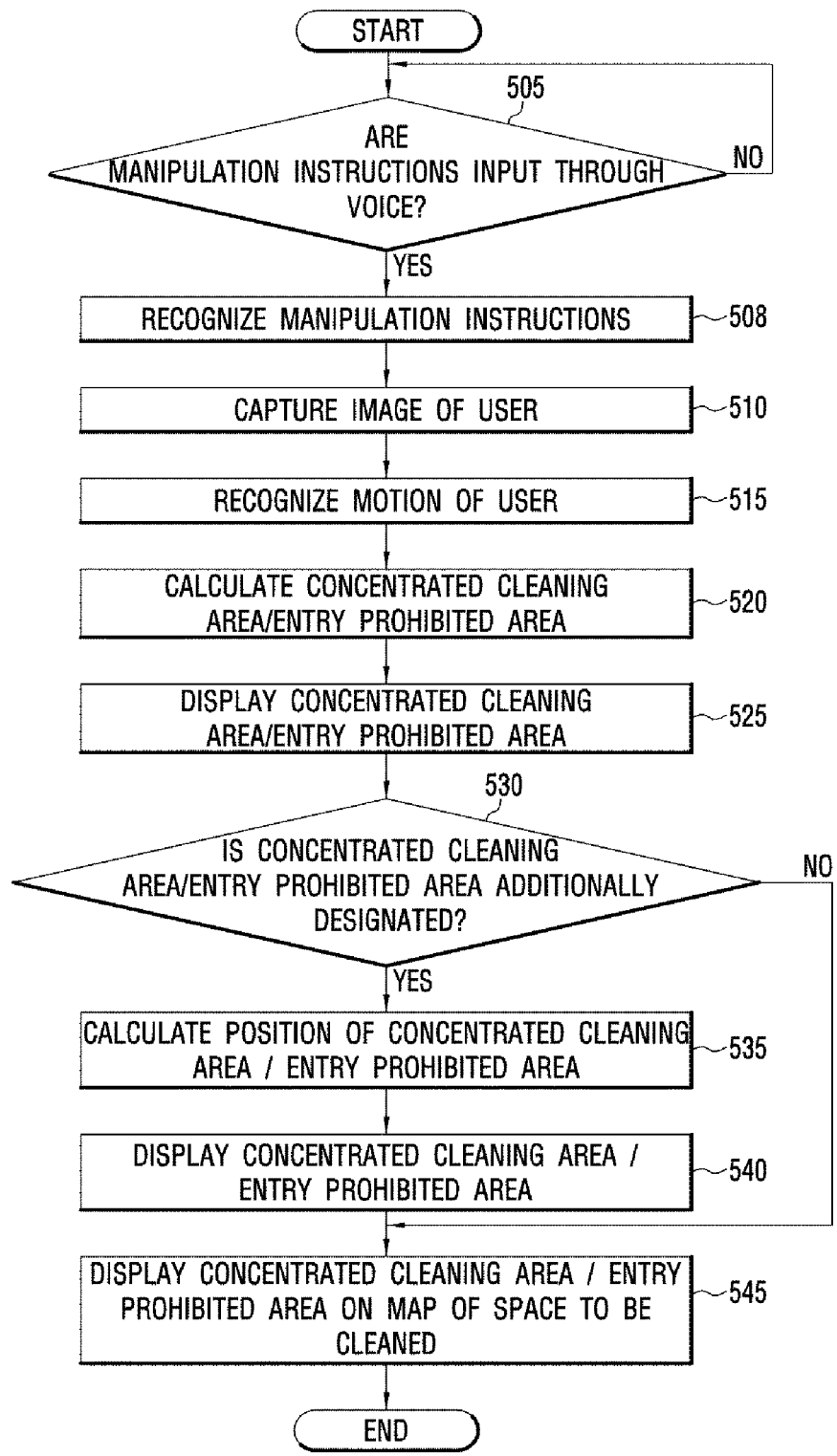
FIG. 18 is a flowchart illustrating a method of inputting and displaying the focused cleaning area and the restricted area using the cleaning robot and the portable mobile terminal of FIG. 1 in accordance with an embodiment of the present disclosure.

FIG. 18 is a flowchart illustrating a method of inputting and displaying the focused cleaning area and the restricted area using the cleaning robot and the portable mobile terminal in accordance with an embodiment of the present disclosure.

Simply describing the method of inputting and displaying the focused cleaning area and the restricted area using the cleaning robot (see 100 of FIG. 1) and the portable mobile terminal (see 200 of FIG. 1) in accordance with an embodiment of the present disclosure with reference to FIG. 18, it is determined whether the user's manipulation instructions are input to the cleaning robot (see 100 of FIG. 1) through voice while the space to be cleaned is cleaned (Operation 505).

When the manipulation instructions are input through voice ("YES" in Operation 505), the cleaning robot (see 100 of FIG. 1) detects the manipulation instructions (Operation 508). In detail, as a result of detecting the manipulation instructions, when the manipulation instructions are call instructions, the cleaning robot (see 100 of FIG. 1) determines a position of the user and rotates toward the position of the user.

Next, the cleaning robot (see 100 of FIG. 1) captures an image of the user (Operation 510).

Next, the cleaning robot (see 100 of FIG. 1) detects a motion of the user (Operation 515). In detail, the cleaning robot (see 100 of FIG. 1) detects the user's focused cleaning area input instructions or restricted area input instructions through the image of the user.

Next, the cleaning robot (see 100 of FIG. 1) determines a position of the focused cleaning area or the restricted area through the user's motion (Operation 520).

Next, the cleaning robot (see 100 of FIG. 1) displays the focused cleaning area or the restricted area (Operation 525). Also, the cleaning robot (see 100 of FIG. 1) may transmit information regarding the focused cleaning area or the restricted area to the portable mobile terminal (see 200 of FIG. 1), and the portable mobile terminal (see 200 of FIG. 1) may display the focused cleaning area or the restricted area.

Next, the portable mobile terminal (see 200 of FIG. 1) determines whether the user additionally inputs the focused cleaning area or the restricted area (Operation 530).

When the user additionally inputs the focused cleaning area or the restricted area ("YES" in Operation 530), the portable mobile terminal (see 200 of FIG. 1) determines a position of the focused cleaning area or the restricted area (Operation 535) and displays the focused cleaning area or the restricted area (Operation 540).

Also, the portable mobile terminal (see 200 of FIG. 1) displays the focused cleaning area or the restricted area on a map of a space to be cleaned on which the space to be cleaned is displayed (Operation 545).

When it is determined that the user does not additionally input the focused cleaning area or the restricted area ("NO" in Operation 530), the portable mobile terminal (see 200 of FIG. 1) displays the focused cleaning area or the restricted area transmitted by the cleaning robot (see 100 of FIG. 1) on the map of the space to be cleaned on which the space to be cleaned is displayed.

The method of setting the focused cleaning area and the restricted area using the cleaning robot and the portable mobile terminal illustrated in FIG. 1 in accordance with an embodiment of the present disclosure has been described above. Hereinafter, a method of setting the focused cleaning area and the restricted area using the cleaning robot and the portable mobile terminal illustrated in FIG. 1 in accordance with another embodiment of the present disclosure will be described.

Figure 19:
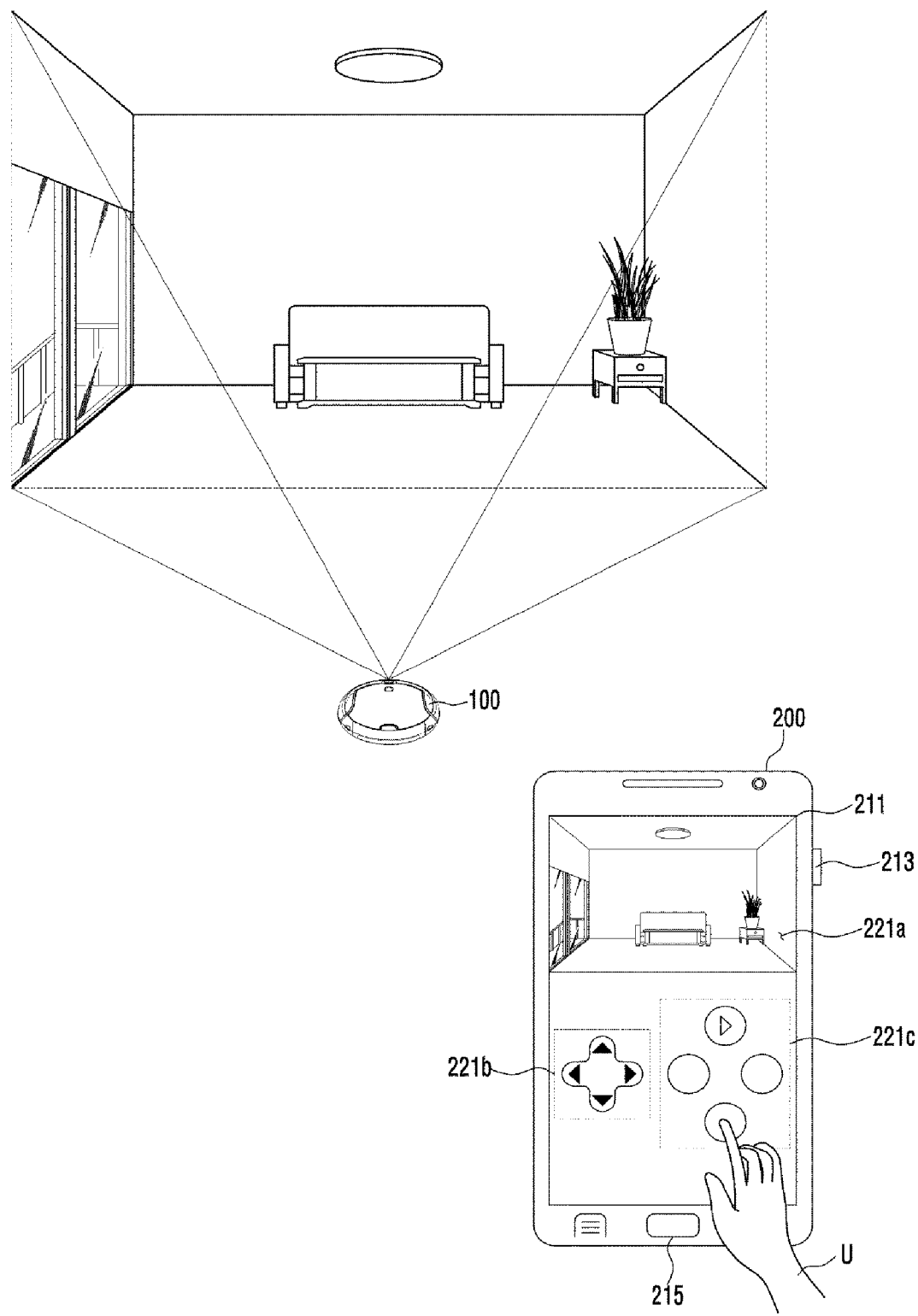
FIG. 19 illustrates the case in which the cleaning robot of FIG. 1 receives manipulation instructions from the user through the portable mobile terminal.

FIG. 19 illustrates the case in which the cleaning robot of FIG. 1 receives manipulation instructions from the user through the portable mobile terminal.

Referring to FIG. 19, the cleaning robot 100 receives the user's manipulation instructions through the portable mobile terminal 200 during a manual cleaning mode.

In detail, the cleaning robot 100 transmits an image captured by the image capturing unit (see 130 of FIG. 2A) to the portable mobile terminal 200, and the user U may manipulate a travelling direction of the cleaning robot 100 using a direction key 221b disposed on the TSP 211 of the portable mobile terminal 200 while watching an image 221a of the cleaning robot 100 displayed on the TSP 211 of the portable mobile terminal 200.

The user U may input focused cleaning area input instructions or restricted area input instructions through a motion instruction input area 221c disposed on the TSP 211 of the portable mobile terminal 200 during the travelling manipulation of the cleaning robot 100.

When the focused cleaning area input instructions or the restricted area input instructions are input from the user, the portable mobile terminal 200 displays a two-dimensional image captured by the cleaning robot 100 when the focused cleaning area input instructions or the restricted area input instructions are input and informs the cleaning robot 100 that the focused cleaning area input instructions or the restricted area input instructions are input. The cleaning robot 100 that has been informed that the focused cleaning area input instructions or the restricted area input instructions are input transmits position information of the cleaning robot 100 within the space to be cleaned to the portable mobile terminal 200.

Figure 20:
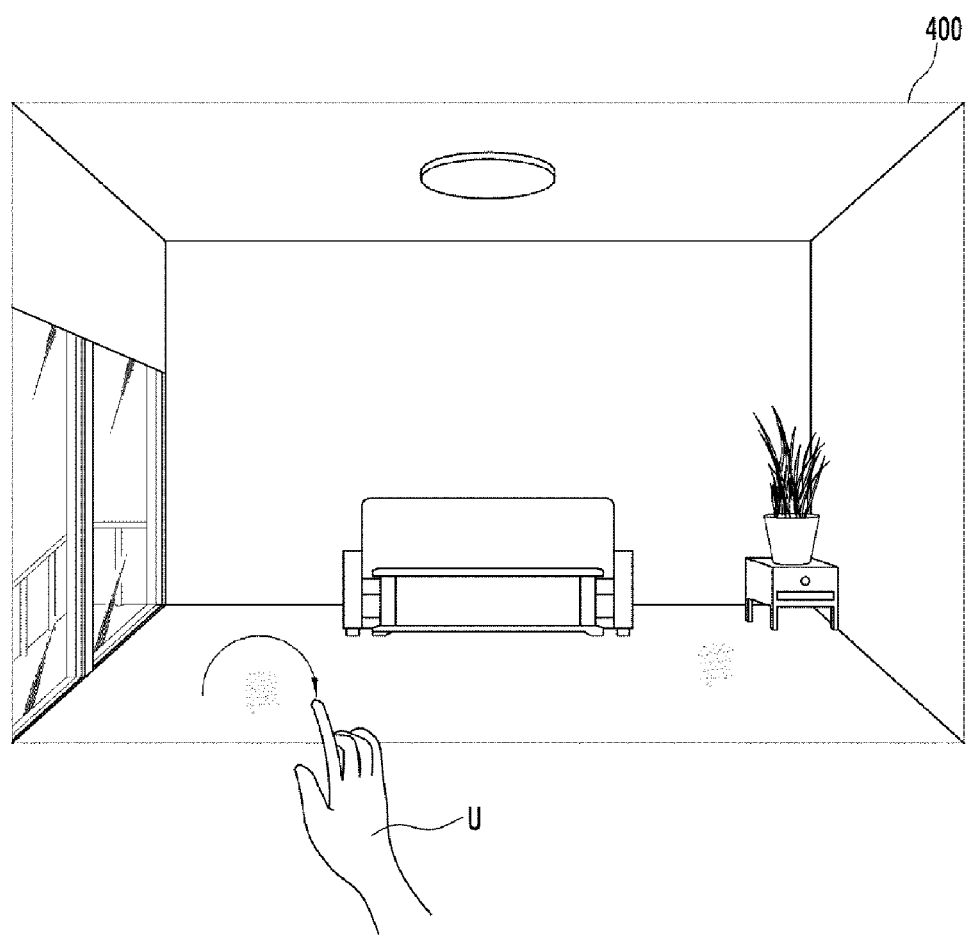
FIG. 20 illustrates a screen on which information regarding the focused cleaning area is input through the portable mobile terminal of FIG. 1.
Figure 21:
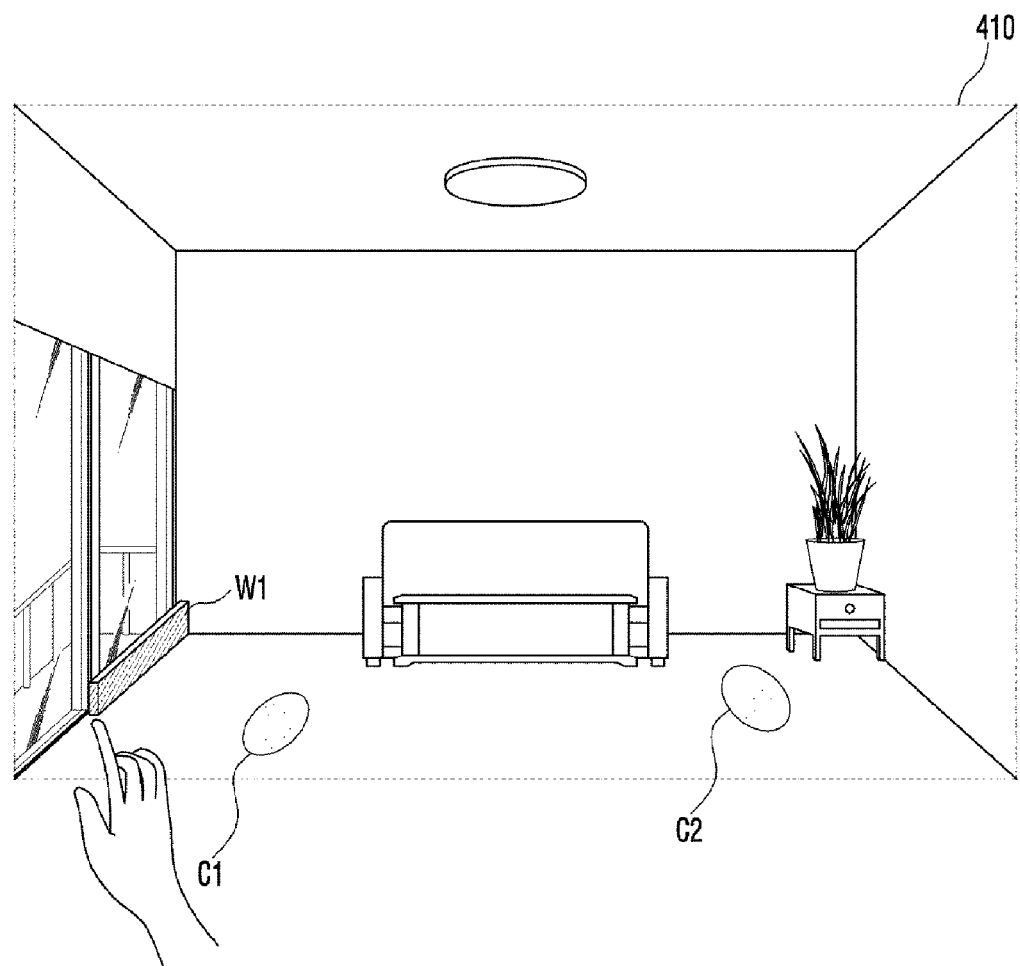
FIGS. 21 and 22 illustrate a screen on which information regarding the restricted area is input through the portable mobile terminal of FIG. 1.
Figure 22:
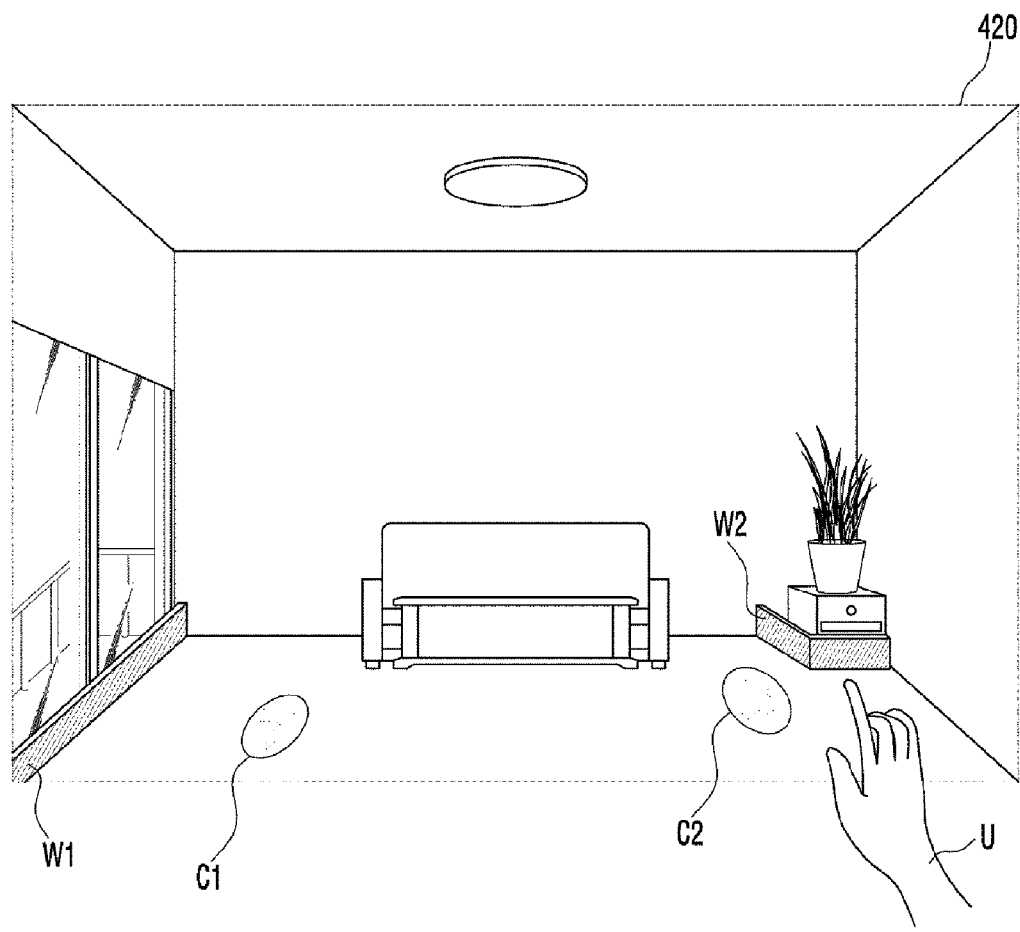

FIG. 20 illustrates a screen on which information regarding the focused cleaning area is input through the portable mobile terminal of FIG. 1, and FIGS. 21 and 22 illustrate a screen on which information regarding the restricted area is input through the portable mobile terminal of FIG. 1.

The user U may input focused cleaning area input instructions and may touch a position to be designated as the focused cleaning area on a cleaning area screen 400 displayed on the TSP (see 211 of FIG. 19) of the portable mobile terminal 200, as illustrated in FIG. 20 or may touch and drag an area to be designated as the focused cleaning area, thereby designating a first focused cleaning area C1.

When the user U inputs the first focused cleaning area C1 through the TSP 211, the portable mobile terminal 200 displays a cleaning area screen (not shown) on which the first focused cleaning area C1 is displayed on the two-dimensional image using augmented reality.

Also, when the user U wants to additionally input a second focused cleaning area C2 in addition to the first focused cleaning area C1, the user U may touch a position to be designated as the focused cleaning area on the TSP (see 211 of FIG. 19) of the portable mobile terminal 200 or may touch and drag an area to be designated as the focused cleaning area, thereby designating the second focused cleaning area C2. The portable mobile terminal 200 displays a cleaning area screen 410 on which the first focused cleaning area C1 and the second focused cleaning area C2 are displayed on the two-dimensional image through the TSP (see 211 of FIG. 19) using augmented reality.

When the user U wants to input the restricted area, the user U may input restricted area input instructions and may touch a position to be designated as the restricted area on the TSP (see 211 of FIG. 19) of the portable mobile terminal 200, as illustrated in FIGS. 21 and 22 or may touch and drag an area to be designated as the focused cleaning area, thereby designating a first restricted area W1 and a second restricted area W2.

When the user U inputs the first restricted area W1 and the second restricted area W2 through the TSP (see 211 of FIG. 19), the portable mobile terminal 200 displays a cleaning area screen 420 on which the first restricted area W1 and the second restricted area W2 are displayed on the two-dimensional image using augmented reality.

Figure 23:
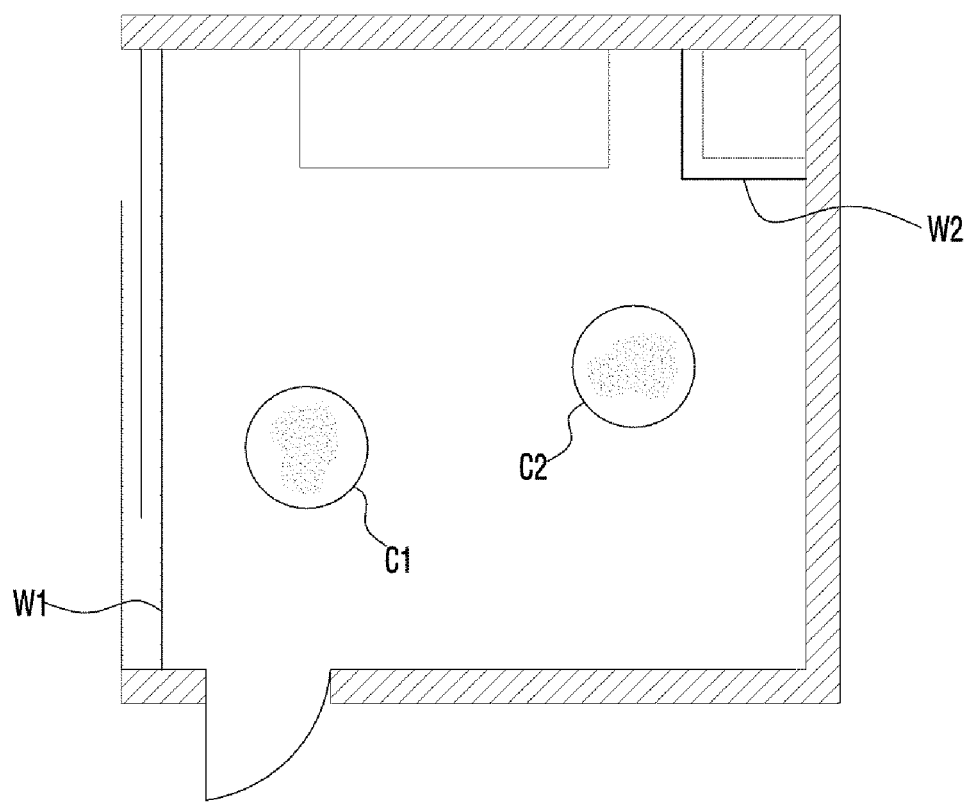
FIG. 23 illustrates a screen on which the portable mobile terminal of FIG. 1 displays the focused cleaning area and the restricted area.

FIG. 23 illustrates a screen on which the portable mobile terminal of FIG. 1 displays the focused cleaning area and the restricted area.

The portable mobile terminal 200 may display positions of the focused cleaning areas C1 and C2 and the restricted areas W1 and W2 in a plan view (map) of a space to be cleaned, as illustrated in FIG. 23.

When the user U completes input of the focused cleaning areas C1 and C2 and the restricted areas W1 and W2, two-dimensional relative coordinates of the focused cleaning areas C1 and C2 and the restricted areas W1 and W2 are determines based on screen coordinates of the focused cleaning areas C1 and C2 and the restricted areas W1 and W2. Thereafter, the portable mobile terminal 200 determines absolute coordinates of the focused cleaning areas C1 and C2 and the restricted areas W1 and W2, i.e., positions of the focused cleaning areas C1 and C2 and the restricted areas W1 and W2 within the space to be cleaned, using a position of the cleaning robot 100 when the cleaning robot 100 captures a two-dimensional image and two-dimensional relative coordinates of the focused cleaning areas C1 and C2 and the restricted areas W1 and W2. Also, the portable mobile terminal 200 transmits the absolute coordinates of the focused cleaning areas C1 and C2 and the restricted areas W1 and W2 to the cleaning robot 100 so that the cleaning robot 100 may detect the focused cleaning areas C1 and C2 and the restricted areas W1 and W2.

When the absolute coordinates of the focused cleaning areas C1 and C2 and the restricted areas W1 and W2 are determined, the portable mobile terminal 200 may display the map of the space to be cleaned and may display positions of the focused cleaning areas C1 and C2 and the restricted areas W1 and W2 on the map of the space to be cleaned.

Figure 24:
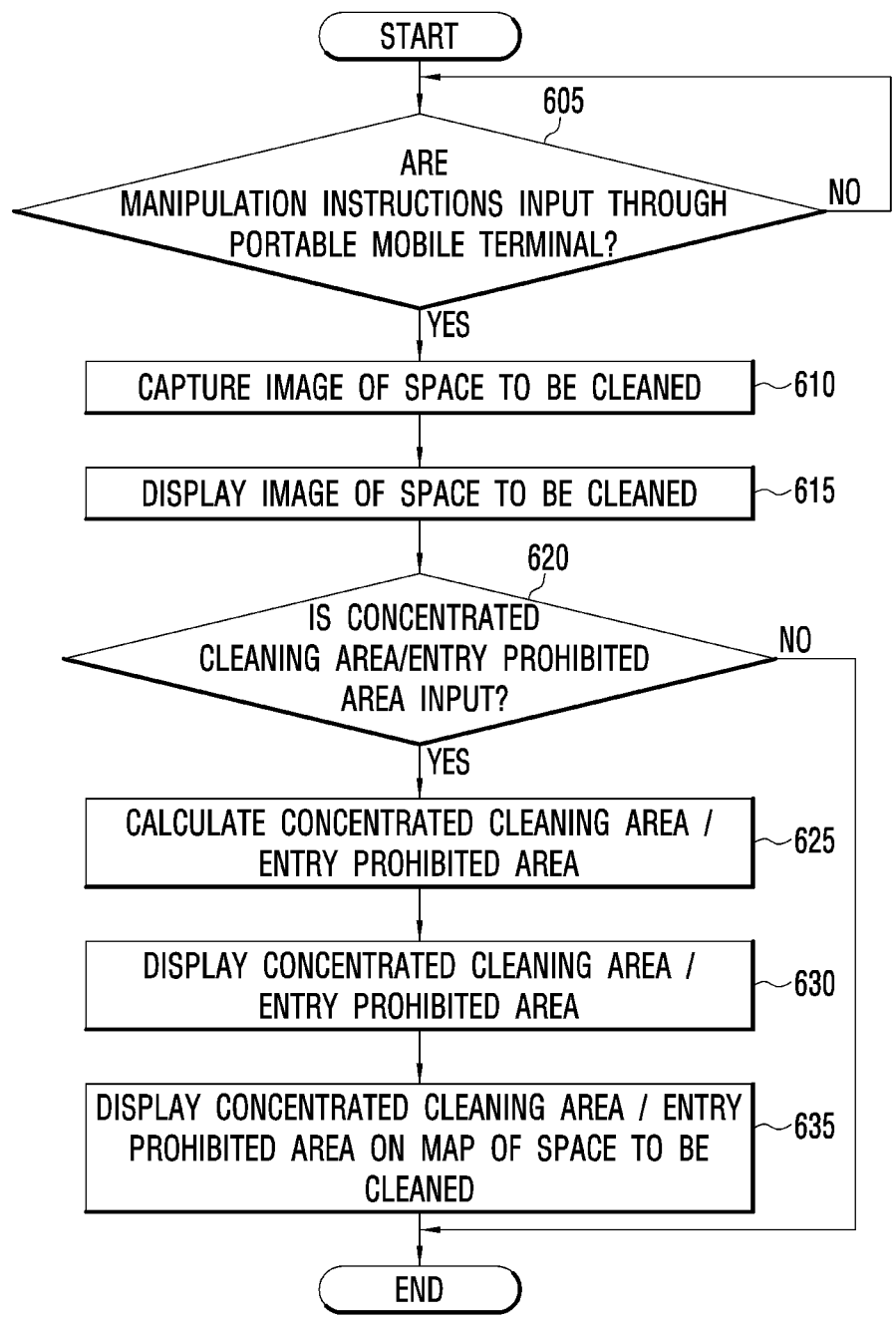
FIG. 24 is a flowchart illustrating a method of inputting and displaying the focused cleaning area and the restricted area using the cleaning robot and the portable mobile terminal of FIG. 1 in accordance with another embodiment of the present disclosure.

FIG. 24 is a flowchart illustrating a method of inputting and displaying the focused cleaning area and the restricted area using the cleaning robot and the portable mobile terminal of FIG. 1 in accordance with another embodiment of the present disclosure.

Simply describing the method of inputting and displaying the focused cleaning area and the restricted area using the cleaning robot (see 100 of FIG. 1) and the portable mobile terminal (see 200 of FIG. 1) in accordance with another embodiment of the present disclosure with reference to FIG. 18, it is determined whether the user's cleaning area input instructions or restricted input instructions are input to the cleaning robot (see 100 of FIG. 1) through the portable mobile terminal (see 200 of FIG. 1) while the space to be cleaned is cleaned in a manual mode (Operation 605).

When the user's cleaning area input instructions or restricted input instructions are input through the portable mobile terminal (see 200 of FIG. 1; "YES" in Operation 605), the cleaning robot (see 100 of FIG. 1) captures an image of a space to be cleaned (Operation 610). Also, the cleaning robot (see 100 of FIG. 1) transmits the captured image of the space to be cleaned to the portable mobile terminal (see 200 of FIG. 1).

Next, the portable mobile terminal (see 200 of FIG. 1) displays the image of the space to be cleaned (Operation 615).

Next, the portable mobile terminal (see 200 of FIG. 1) determines whether the user inputs a focused cleaning area or a restricted area (Operation 620).

When it is determined that the user inputs the focused cleaning area or the restricted area ("YES" in Operation 620), the portable mobile terminal (see 200 of FIG. 1) determines a position of the focused cleaning area or the restricted area (Operation 625) and displays the focused cleaning area or the restricted area (Operation 630).

Also, the portable mobile terminal (see 200 of FIG. 1) displays the focused cleaning area or the restricted area on a map of a space to be cleaned on which the space to be cleaned is displayed (Operation 635).

When it is determined that the user does not input the focused cleaning area or the restricted area ("NO" in Operation 620), the portable mobile terminal (see 200 of FIG. 1) displays the map of the space to be cleaned on which the space to be cleaned is displayed (Operation 635).

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A cleaning robot that performs cleaning while travelling a space to be cleaned, the cleaning robot comprising:
    a travelling unit that moves the cleaning robot;
    a cleaning unit that cleans the space to be cleaned;
    an image capturing unit that captures an image viewed from the cleaning robot;
    a voice input unit to which a user's voice instructions are input;
    a communication unit that communicates with a user terminal; and
    a controller that obtains a user's motion instructions through the image capturing unit when the user's voice instructions are input through the voice input unit and determines a restricted area and/or a focused cleaning area based on the user's motion instructions,
    wherein the controller transmits the image captured by the image capturing unit and information regarding the restricted area and/or the focused cleaning area to the user terminal through the communication unit, and
    the transmitted image and the information regarding the restricted area and/or the focused cleaning area are displayed on the user terminal.

2. The cleaning robot of claim 1, wherein the voice input unit comprises at least three microphones to which the user's voice instructions are input.

3. The cleaning robot of claim 2, wherein the controller estimates a position of a user based on a difference in times at which the user's voice instructions are input to the at least three microphones.

4. The cleaning robot of claim 3, wherein the controller controls the travelling unit to rotate the cleaning robot so that the image capturing unit is directed toward the position of the user.

5. The cleaning robot of claim 1, wherein the image capturing unit comprises a camera that captures a two-dimensional image of the user and an infrared sensor that obtains distance information of the user captured by the camera.

6. The cleaning robot of claim 5, wherein the controller detects a motion of the user based on the two-dimensional image of the user captured by the image capturing unit and the distance information of the user obtained by the image capturing unit.

7. The cleaning robot of claim 6, wherein the controller detects a hand and a shoulder of the user from the two-dimensional image of the user and determines coordinates of the hand and the shoulder of the user based on the distance information of the user.

8. The cleaning robot of claim 7, wherein the controller determines an area instructed by the user based on the coordinates of the hand and the shoulder of the user and determines the area instructed by the user as the restricted area and/or the focused cleaning area.

9. A method of controlling a cleaning robot that performs cleaning while travelling a space to be cleaned, the method comprising:
    obtaining an image by an image capturing unit when a user's voice instructions are input from a user;
    obtaining a motion instruction of the user based on the image; and
    determining a restricted area and/or a focused cleaning area based on the user's voice instructions and the motion instruction of the user; and
    transmitting images the image captured by the image capturing unit and information regarding the restricted area and/or the focused cleaning area to a user terminal,
    wherein the transmitted image and the information regarding the restricted area and/or the focused cleaning area are displayed on the user terminal.

10. The method of claim 9, the method further comprising:
    determining a position of the user based on a difference in times at which the user's voice instructions are input to a plurality of microphones;
    rotating the cleaning robot toward the position of the user;
    radiating infrared rays toward the user; and
    obtaining distance information of the user based on the infrared rays reflected from the user.

11. The method of claim 9, the method further comprising:
    detecting a hand and a shoulder of the user from the image; and determining coordinates of the hand and the shoulder of the user based on distance information of the user.

12. The method of claim 11, the method further comprising:
    determining an area instructed by the user based on the coordinates of the hand and the shoulder of the user; and
    determining the area instructed by the user as the restricted area or the focused cleaning area.

13. The method of claim 9, the method further comprising:
    displaying an image of the space to be cleaned; and
    receiving the restricted area and/or the focused cleaning area from the user with respect to the image of the space to be cleaned.

14. The method of claim 13, the method further comprising:
    determining coordinates of the focused cleaning area and/or the restricted area in the space to be cleaned based on the coordinates of the focused cleaning area and/or the restricted area input with respect to the image of the space to be cleaned.

15. The method of claim 14, the method further comprising:
    displaying an image of the restricted area and/or the focused cleaning area over the image of the space to be cleaned.

16. The cleaning robot of claim 4, wherein the controller controls the travelling unit to rotate in a direction where a rotational displacement is lowest.

17. The cleaning robot of claim 6, wherein the controller detects first and second portions of the user from the two-dimensional image of the user and determines coordinates of the first and second portions of the user based on the distance information of the user.

18. The cleaning robot of claim 17, wherein the controller determines an area instructed by the user based on the coordinates of the first and second portions of the user and determines the area instructed by the user as the restricted area and/or the focused cleaning area.

19. The method of claim 9, the method further comprising:
    detecting first and second portions of the user from the image; and
    determining coordinates of the first and second portions of the user based on distance information of the user.

20. The method of claim 19, the method further comprising:
    determining an area instructed by the user based on the coordinates of the first and second portions of the user; and
    determining the area instructed by the user as the restricted area and/or the focused cleaning area.

* * * * *